(12) United States Patent  
Hayashi et al.

(10) Patent No.: US 12,313,428 B2  
(45) Date of Patent: May 27, 2025

(54) POSITION ESTIMATION METHOD, POSITION ESTIMATION DEVICE, AND POSITION ESTIMATION PROGRAM

(71) Applicant: NIPPON TELEGRAPH AND TELEPHONE CORPORATION, Tokyo (JP)

(72) Inventors: Aki Hayashi, Tokyo (JP); Yuki Yokohata, Tokyo (JP); Takahiro Hata, Tokyo (JP); Kohei Mori, Tokyo (JP); Kazuaki Obana, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 238 days.

(21) Appl. No.: 18/008,571

(22) PCT Filed: Jun. 11, 2020

(86) PCT No.: PCT/JP2020/023011  
§ 371 (c)(1),  
(2) Date: Dec. 6, 2022

(87) PCT Pub. No.: WO2021/250848  
PCT Pub. Date: Dec. 16, 2021

(65) Prior Publication Data  
US 2023/0236038 A1 Jul. 27, 2023

(51) Int. Cl.  
*G01C 21/00* (2006.01)
(52) U.S. Cl.  
CPC ................. *G01C 21/3848* (2020.08)
(58) Field of Classification Search  
CPC .................................................. G01C 21/3848  
See application file for complete search history.

(56) References Cited

U.S. PATENT DOCUMENTS

| 6,597,987 B1 * | 7/2003 | Barton | G01S 19/47 340/988 |
| 9,020,755 B1 * | 4/2015 | Gazit | G01S 19/41 701/470 |

(Continued)

FOREIGN PATENT DOCUMENTS

WO 2020039937 A1 2/2020

OTHER PUBLICATIONS

"Cross-ministerial Strategic Innovation Promotion Program (SIP) Automated driving system for everyone a smile", First SIP Press workshop (vol. 3), May 11, 2018, Internet <URL: https://www8.cao.go.jp/cstp/gaiyo/sip/press/jidosoko.pdf>.

*Primary Examiner* — Naeem Taslim Alam

(57) ABSTRACT

A position estimation unit 25 estimates, for each movement in a predetermined section, a plurality of position candidates of a position estimation target on the basis of position information and sensor information. A position determination unit 26 evaluates, for each movement in the predetermined section, on the basis of the plurality of position candidates of the position estimation target obtained by the movement in the predetermined section, whether the position information used to estimate the position candidates has an error caused by any of a position of a GPS satellite, a position of a mobile body in a real space, or the mobile body or does not have any error caused thereby. The position determination unit 26 determines a final output value of the position of the position estimation target on the basis of a result obtained by removing, from the plurality of estimated position candidates of the position estimation target in the plurality of times of the movement in the predetermined section, a position candidate of the position estimation target estimated in the movement in the predetermined section that has been evaluated to have the error.

8 Claims, 27 Drawing Sheets

(56) References Cited

U.S. PATENT DOCUMENTS

| | | | |
|---|---|---|---|
| 2009/0109090 A1* | 4/2009 | Vollath | G01S 19/07 342/357.44 |
| 2014/0057649 A1* | 2/2014 | Han | H04W 4/025 455/456.1 |
| 2014/0148970 A1* | 5/2014 | Dufford | B60L 58/12 701/1 |
| 2016/0109583 A1* | 4/2016 | Willis | G01S 19/49 342/357.3 |
| 2017/0299729 A1* | 10/2017 | Okada | G01S 19/393 |
| 2018/0365500 A1* | 12/2018 | Nelapati | G01C 21/28 |
| 2019/0251352 A1* | 8/2019 | Hovden | G06T 3/153 |
| 2021/0341605 A1 | 11/2021 | Yoshida et al. | |

* cited by examiner

FIG.15

| TRIP | EVALUATION CRITERION | ERROR AVERAGE [m] |
|---|---|---|
| Trip1 | 20 | 3 |
| Trip2 | 50 | 5 |
| : | : | : |

FIG.18

| CLUSTER | NUMBER OF BELONGING COORDINATE CANDIDATE POINTS | CUMULATIVE OCCUPANCY RATE |
|---|---|---|
| 1 | 80 | 0.8 |
| 2 | 15 | 0.95 |
| 3 | 5 | 1.00 |

POSITION ESTIMATION METHOD, POSITION ESTIMATION DEVICE, AND POSITION ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2020/023011, filed on 11 Jun. 2020, the disclosure of which is hereby incorporated herein by reference in its entirety.

TECHNICAL FIELD

A technology of the present disclosure relates to a position estimation method, a position estimation device, and a position estimation program.

BACKGROUND ART

The importance of approaches to mount a sensor to a mobile body such as a vehicle, a ship, and a robot and create a surrounding map from information obtained from the sensor has been widely recognized. Particularly for automated driving, what kind of surrounding objects such as traffic signs and signboard are located near the mobile body and the positions thereof need to be estimated and reflected onto a surrounding map. This is because there is no database that covers the positions of traffic signs and signboard which are frequently updated.

As a method for estimating the positions of surrounding objects with high precision, a technology called simultaneous localization and mapping (SLAM) that simultaneously performs self-position estimation called light detection and ranging or laser imaging detection and ranging (LIDAR) and creation of an environmental map has been known (NPL 1).

However, the map needs to be updated frequently, and the LIDAR is expensive for covering a wide range around the world, and hence attention has been paid to an approach to create a surrounding map from information obtained from an inexpensive sensor. As a method for estimating the positions of surrounding objects by using an inexpensive sensor, a technology for creating a pair of images which have been clipped from camera video taken from a mobile body and in which a common subject (in this case, surrounding object) appears and performing triangulation has been known (PTL 1).

In the case of using video or an image taken from the camera installed on mobile body and a GPS trajectory to uniquely estimate position coordinates of a surrounding object, triangulation results by image pairs sometimes have low reliability due to the influence of decrease in GPS precision. The position coordinate estimation device in PTL 1 uses the following two methods to remove the influence of triangulation results having low reliability.

(First method) A threshold is provided to the value of horizontal dilution of precision (HDOP) indicating reliability of a GPS trajectory in the horizontal direction, and the influence of accidental errors is removed by avoiding the estimation using a GPS with a low value of HDOP.

(Second method) In outputting of final estimated position coordinates, simple statistical processing that employs a mean value or a median value of coordinate distribution estimated by triangulation is performed to remove the influence of limited system errors in the coordinate distribution.

CITATION LIST

Non Patent Literature

[NPL 1] "Cross-ministerial Strategic Innovation Promotion Program (SIP) Automated driving system for everyone a smile", First SIP Press workshop (Vol. 3), May 11, 2018, Internet <URL: https://www8.cao.go.jp/cstp/gaiyo/sip/press/jidosoko.pdf>

Patent Literature

[PTL 1] WO 2020/039937

SUMMARY OF THE INVENTION

Technical Problem

For estimating the positions of objects around a mobile body and reflecting the positions onto a surrounding map focusing on automated driving, the LIDAR can achieve high precision, but the cost is high. It is thus difficult to continuously update the positions everyday while covering the wide range.

In the method in PTL 1, position coordinates are estimated by using positioning information obtained by an inexpensive sensor without using an expensive sensor. Against a problem when an inexpensive sensor is used, in NPL 1, time-series sensor data is processed by a statistical method. However, the relation between a mobile body and surrounding environments when sensor data included in time-series sensor data is acquired is not taken into consideration, and hence there is still room for improvement to the estimation of position coordinates using the sensor data.

The disclosed technology has been made in view of the above, and it is an object thereof to provide a position estimation method, a position estimation device, and a position estimation program capable of estimating the position of a position estimation target located in a section where a mobile body moves or located around the section with high precision.

Means for Solving the Problem

A first aspect of the present disclosure provides a position estimation method for estimating a position of a position estimation target located in a vicinity of a mobile body by using sensor information obtained when the mobile body moves in a predetermined section a plurality of times while carrying out sensing, and position information at which the sensor information is acquired, the position estimation method including: an estimation step for estimating, for each movement in the predetermined section, a plurality of position candidates of the position estimation target based on the position information and the sensor information; an evaluation step for evaluating, for each movement in the predetermined section, based on a plurality of the position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body or does not have any error caused by any of the position of the GPS satellite, the position of the mobile body, or the mobile body; and a determination step for determining a final output value of the position of the position estimation target based on a result obtained by removing, from the plurality of estimated position candidates of the position estimation target at the plurality of times of the movement in the predetermined section, a position candidate of the position estimation target estimated in the movement in the predetermined section that has been evaluated to have the error.

A second aspect of the present disclosure provides a position estimation device for estimating a position of a position estimation target located in a vicinity of a mobile body by using sensor information obtained when the mobile body moves in a predetermined section a plurality of times while carrying out sensing, and position information at which the sensor information is acquired, the position estimation device including: a position estimation unit for estimating, for each movement in the predetermined section, a plurality of position candidates of the position estimation target based on the position information and the sensor information; and a position determination unit for evaluating, for each movement in the predetermined section, based on a plurality of the position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body or does not have any error caused by any of the position of the GPS satellite, the position of the mobile body, or the mobile body, and determining a final output value of the position of the position estimation target on the basis of a result obtained by removing, from the plurality of estimated position candidates of the position estimation target at the plurality of times of the movement in the predetermined section, a position candidate of the position estimation target estimated in the movement in the predetermined section that has been evaluated to have the error.

A third aspect of the present disclosure provides a position estimation program for estimating a position of a position estimation target located in a vicinity of a mobile body by using sensor information obtained when the mobile body moves in a predetermined section a plurality of times while carrying out sensing, and position information at which the sensor information is acquired, the position estimation program causing a computer to execute: estimating, for each movement in the predetermined section, a plurality of position candidates of the position estimation target based on the position information and the sensor information; evaluating, for each movement in the predetermined section, based on a plurality of the position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body or does not have any error caused by any of the position of the GPS satellite, the position of the mobile body, or the mobile body; and determining a final output value of the position of the position estimation target based on a result obtained by removing, from the plurality of estimated position candidates of the position estimation target at the plurality of times of the movement in the predetermined section, a position candidate of the position estimation target estimated in the movement in the predetermined section that has been evaluated to have the error.

Effects of the Invention

According to the disclosed technology, the position of a position estimation target located around a mobile body can be estimated with high precision.

BRIEF DESCRIPTION OF DRAWINGS

FIG. 15 is a diagram illustrating an example of arrays of evaluation criteria and error averages for each trip.

FIG. 18 is a diagram illustrating an example of the number of belonging coordinate candidate points and the cumulative occupancy for each cluster.

DESCRIPTION OF EMBODIMENTS

Figure 1:
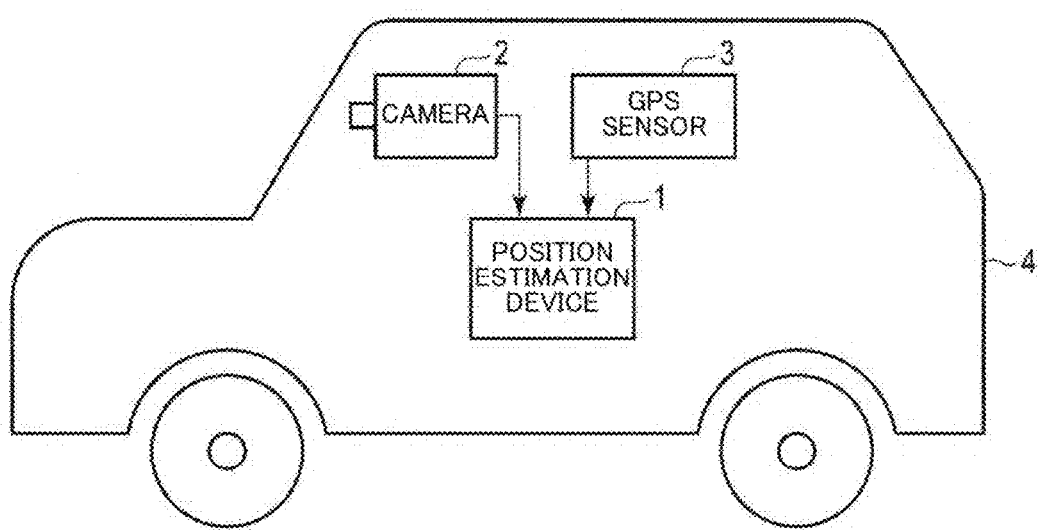
FIG. 1 is a schematic configuration diagram of an on-vehicle system including a position estimation device in the present embodiment.

An example of embodiments of the disclosed technology is described below with reference to the drawings. Note that the same or equivalent components and parts in the drawings are denoted by the same reference symbols. The dimensional ratios in the figures are exaggerated for the sake of description, and are sometimes different from the actual ratios.

Outline of Present Embodiment

The first method in PTL 1 is used to sort by HDOP value, and the second method is to perform simple statistical processing to output the median or mean value. However, the following problems (a) to (j) occur to cause a decrease in estimation accuracy when position estimation is performed using methods such as triangulation based on dynamic information acquired from a mobile object using inexpensive sensors.

(a) Temporary GPS inaccuracy dependent on location and conditions caused by obstructions such as elevated tracks, buildings, and mobile objects traveling ahead.

(b) Temporary degradation of GPS accuracy due to unfavorable placement of GPS satellites in the sky.

(c) The number of pairs that can be triangulated is reduced due to the vehicle speed being too high.

(d) There is a gap between the position of the camera and the vehicle's position information acquisition device such as a GPS.

(e) The time gap between the camera image and the location information is caused by frame skipping due to insufficient processing performance of the camera.

(f) Factors such as (a) to (e) above cause the estimation to deviate from the correct position continuously for a certain period of time, resulting in systematic errors.

(g) When the intersection angle at which triangulation is performed becomes an acute angle, there are events that make triangulation impossible, such as when traffic is congested, when the car is stopped, or when an object is captured in the center of the image.

(h) If the sign of the line of gaze vector from the vehicle's position to the matching surrounding object is negative between the pairs created for triangulation, an error in pair image matching will result in the intersection of the line of gaze vectors of the pairs behind the vehicle in the direction of travel, and position estimation cannot be performed properly.

(i) When detecting from the video which object is the pre-learned object in the vicinity, the matching rate is reduced due to the difference in size between the pre-learned template image and the subject in the input image.

(j) A decrease in the matching rate occurs when the object to be estimated is hidden by other objects, such as the vehicle in front or plants in the vicinity.

The problems (a) to (j) above can be broadly classified into: problems caused by the location of the GPS satellites used to estimate the location information, problems caused by the location of the mobile object in real space when the location information is obtained, and problems caused by the mobile object itself.

The first method in PTL 1 refers to the value of HDOP. The value of HDOP is calculated based on the desirability of GPS satellite placement in the sky. Thus, the method can solve the problem (b), but cannot solve the problem (a).

In addition, the second method in PTL 1 above uses the average or median value obtained from multiple estimation points as the final result, which means that, due to factors such as (a) to (e) above, if the GPS accuracy is temporary reduced and the estimation accuracy of a small portion of the triangulation results is reduced, the effect can be statistically eliminated. However, as mentioned in (f), when the GPS accuracy continues to decrease for a certain period of time and most of the triangulation results are wrong, it is not possible to eliminate the effect of unreliable triangulation results.

This embodiments of the present invention solve the problem that arises when estimating the position of surrounding objects by using sensor information and positional information acquired using inexpensive sensors mounted on a mobile object, such as those listed above, by adding ingenuity during triangulation and by adding reliability to the estimation results through statistical processing.

In the following, movement of a vehicle in a predetermined section while taking moving images or still images by an on-vehicle camera is referred to as "trip". The predetermined section is a period sectioned for every predetermined period. Note that the predetermined section may be a region sectioned by given meshes on a map, and may be a region sectioned in units of roads.

Each object around a vehicle is referred to as "object", and the object is an example of a position estimation target. A stationary object corresponds to the object. Stationary objects may include fixed objects such as road signs, traffic lights, telephone poles, mailboxes, automatic vending machines, buildings, and signboard as well as objects located at the same positions at least for a given period of time such as parked vehicles and road cones. Stationary objects can include other vehicles temporarily stopped and persons waiting for traffic lights. Note that, for example, even the same "no parking signs" are regarded as different objects when two or more signs are disposed at different locations.

A triangulation result estimated as position coordinates of an object by a method such as triangulation is referred to as "coordinate candidate point". From one image pair, one coordinate candidate point of an object matched by the image pair is calculated. Thus, a plurality of coordinate candidate points are output from single traveling.

Position coordinates of an object that are finally uniquely determined by referring to a distribution of coordinate candidate points are referred to as "final output value of position coordinates". Note that a final output value of position coordinates is calculated by using the coordinate candidate points estimated not only for a single trip but also for multiple trips with overlapping movement ranges.

Configuration of Position Estimation Device According to Present Embodiment

FIG. 1 illustrates an example of an on-vehicle system including a position estimation device 1 in the present embodiment. In FIG. 1, a vehicle 4 is illustrated as an example of a mobile body. The vehicle 4 is not limited to a particular vehicle, and may be vehicles of various individuals, models, or manufacturers. The mobile body may include any mobile body that can mount a sensor thereon, such as a vehicle, a motorcycle, a bicycle, a personal mobility device, a robot, a pedestrian, a ship, an airplane, and a drone. Thus, the on-vehicle system illustrated in FIG. 1 is merely an example, and can be replaced with a smartphone carried by a pedestrian.

In FIG. 1, a position estimation device 1, a camera 2, and a GPS sensor 3 in the present embodiment are mounted to the vehicle 4 that is a mobile body.

The camera 2 uses a solid-state imaging device such as a charge coupled device (CCD) or complementary metal oxide semiconductor (CMOS) sensor. The installed location, orientation, and angle of the camera 2 are set such that a road region in a freely selected direction such as a traveling direction of the vehicle 4 is included in an imaging range. The camera 2 acquires a taken image, and outputs the acquired image to the position estimation device 1.

Note that an image acquired by the camera 2 may be a moving image, and may be a still image taken at a given time interval.

The GPS sensor 3 receives GPS signals transmitted from a plurality of GPS satellites, and performs ranging computation to calculate the latitude and longitude of the vehicle 4. The GPS sensor 3 outputs position information including the calculated longitude and latitude to the position estimation device 1. The position information can include information indicating the likelihood of GPS measurement in addition to the longitude and the latitude. Note that, in the following, the longitude and the latitude are sometimes referred to as "position coordinates". The likelihood of GPS measurement is, for example, an index determined depending on the arrangement conditions of the GPS satellite. Note that the acquisition of position coordinates is not limited to the GPS sensor 3, and other means such as the use of position information on wireless base stations and Wi-Fi (registered trademark) access points may be used as long as the equivalent function is exhibited.

Figure 2:
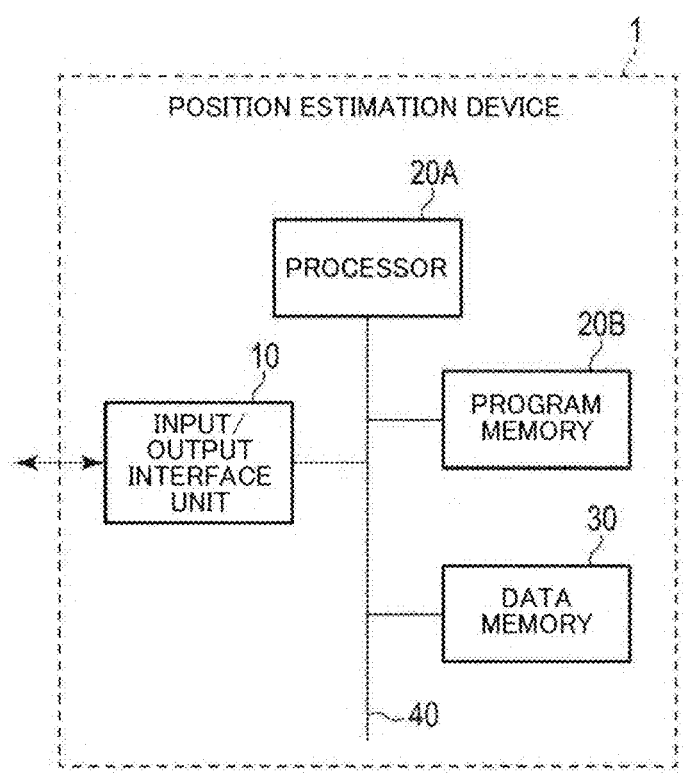
FIG. 2 is a block diagram illustrating a hardware configuration of the position estimation device in the present embodiment.

FIG. 2 is a block diagram illustrating a hardware configuration of the position estimation device 1 in the present embodiment.

As illustrated in FIG. 2, the position estimation device 1 includes an input/output interface unit 10, a processor 20A such as a central processing unit (CPU), a program memory 20B, and a data memory 30. The components are connected so as to mutually communicable through a bus 40.

The input/output interface unit 10 includes, for example, one or more wired or wireless communication interface units. The input/output interface unit 10 receives information from an external device including the camera 2 and the GPS sensor 3, and outputs information generated by the position estimation device 1 to the outside.

The processor 20A is a central processing unit, and executes various kinds of programs and controls the units. Specifically, the processor 20A reads a program from the data memory 30, and executes the program by using the program memory 20B as a workspace. The processor 20A controls the above-mentioned components and performs various kinds of arithmetic processing in accordance with programs stored in the data memory 30. In the present embodiment, a position estimation program is stored in the data memory 30. The position estimation program may be a single program, and may be a program group configured by a plurality of programs or modules.

The program memory 20B stores therein various kinds of programs and various kinds of data. The program memory 20B temporarily stores therein programs or data as a workspace. The data memory 30 is configured by a hard disk drive (HDD) or a solid state drive (SSD), and stores therein various kinds of programs including an operating system and various kinds of data.

Figure 3:
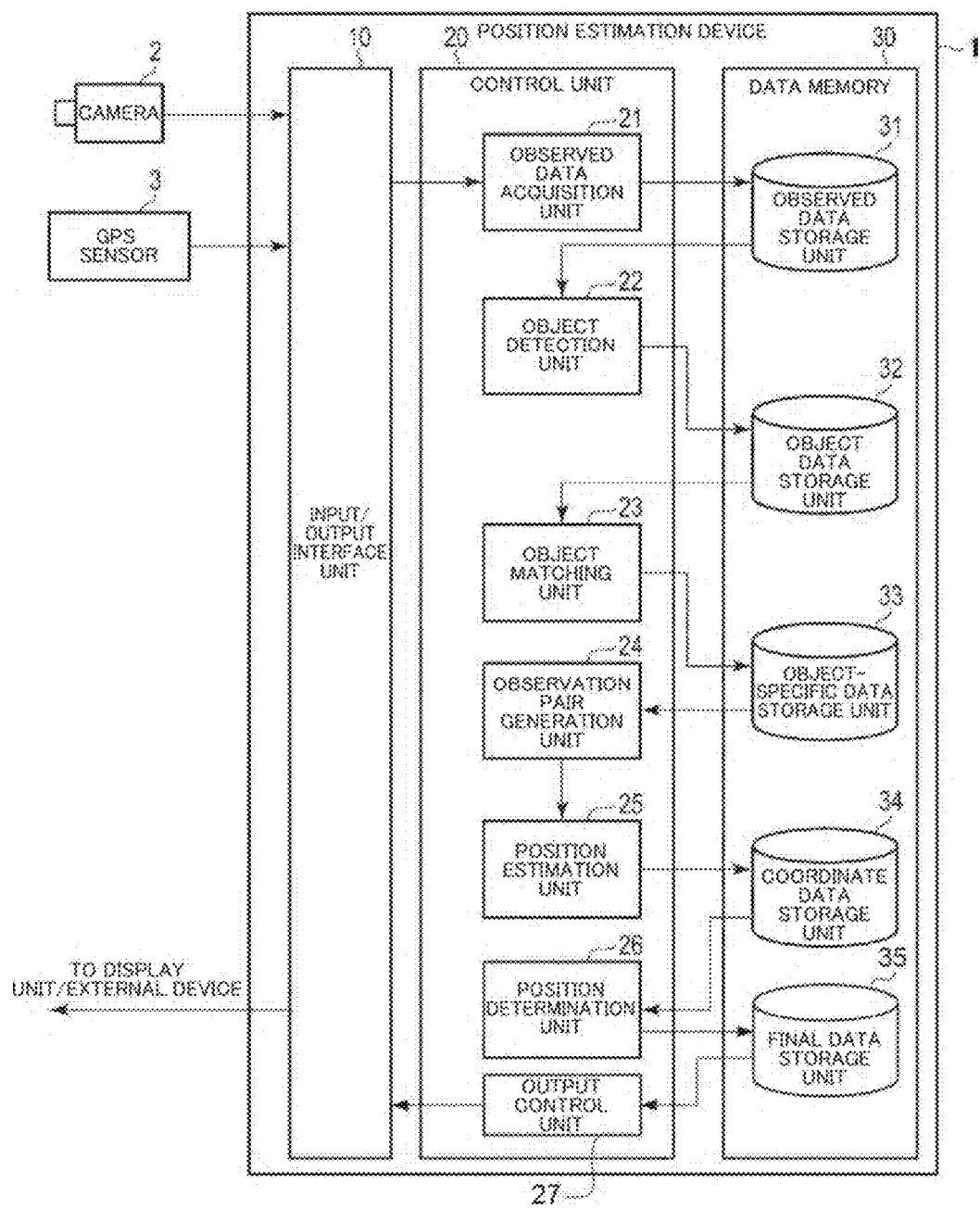
FIG. 3 is a block diagram illustrating a functional configuration of the position estimation device in the present embodiment.

Next, a functional configuration of the position estimation device 1 is described. FIG. 3 is a block diagram illustrating an example of the functional configuration of the position estimation device 1.

The input/output interface unit 10 receives images recorded by a camera 2 such as a drive recorder mounted on the vehicle 4 and position information from a GPS sensor 3 mounted on the vehicle 4, and outputs the images and the position information to the control unit 20. In the present embodiment, the input/output interface unit 10 receives images obtained when the vehicle 4 moves while sensing and position information. Furthermore, the input/output interface unit 10 outputs data output from the control unit 20 to the outside. For example, estimated position coordinates are output as an output result to visualization means for mapping position information on a map through the input/output interface unit 10. Alternatively, the input/output interface unit 10 can output display data generated for displaying an estimation result of position coordinates to, for example, a display unit of a car navigation device (not shown) of the vehicle 4, so that the display data is displayed.

A storage area of the data memory 30 includes an observed data storage unit 31, an object data storage unit 32, an object-specific data storage unit 33, a coordinate data storage unit 34, and a final data storage unit 35.

The observed data storage unit 31 is used to store therein images obtained by the camera 2 and position information obtained by the GPS sensor 3. Hereinafter, the images and the position information are sometimes collectively referred to as "observed data".

The object data storage unit 32 is used to store therein information for identifying an object detected in an image together with position information associated with the image.

The object-specific data storage unit 33 is used to store therein images and position information divided for each detected object.

The coordinate data storage unit 34 is used to store therein position coordinate data on an object together with an image of the object or identification information on the object.

The final data storage unit 35 is used to store therein a final output value of position coordinates of the object.

Note that the observed data storage unit 31 to the final data storage unit 35 are not essential configurations, and, for example, may be provided in an external storage device such as a database server disposed in a cloud. In this case, the position estimation device 1 accesses the database server in the cloud through a communication network to acquire necessary data.

The control unit 20 is configured by the above-mentioned processor 20A and the above-mentioned program memory 20B, and functionally includes an observed data acquisition unit 21, an object detection unit 22, an object matching unit 23, an observation pair generation unit 24, a position estimation unit 25, a position determination unit 26, and an output control unit 27.

The observed data acquisition unit 21 fetches an image output from the camera 2 and position information output from the GPS sensor 3 through the input/output interface unit 10, and stores the image and the position information in the observed data storage unit 31.

The object detection unit 22 reads an image from the observed data storage unit 31, performs processing for detecting whether an object whose position coordinates are to be estimated appears in the image, and stores a detection result in the object data storage unit 32. For example, the object detection unit 22 can provide box information indicating the detected object to the image, and store the resultant in the object data storage unit 32.

The object matching unit 23 detects whether a desired object appears in an image that has been detected to have an object thereon, and detects the name of the object appearing in the image. In this detection, for example, a learned model that has been learned by using the name of an object and an image in which the object appears may be used, or pattern matching may be used.

The matching rate decreases if the differences in distortion and size between the template image learned in advance or prepared for pattern matching and the objects in the input image are not taken into account. Thus, in the present embodiment, lens distortion correction and template enlargement correction are performed. In an image from an on-vehicle camera, distortion is more likely to occur on the outer side of the image than the center part. Accordingly, in the lens distortion correction, matching is performed after distortion is removed from an edge of a subject deformed by distortion. In the template enlargement correction, matching a template and an input image is performed while the template is enlarged and reduced, to thereby prevent the matching rate from decreasing due to the difference in size.

Figure 11:
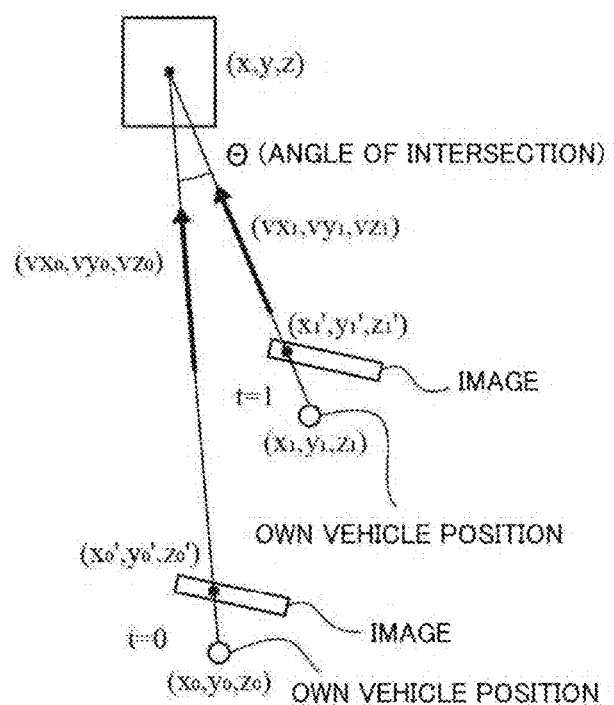
FIG. 11 is a diagram for describing an angle of intersection of gaze vectors in an observation pair.
Figure 12:
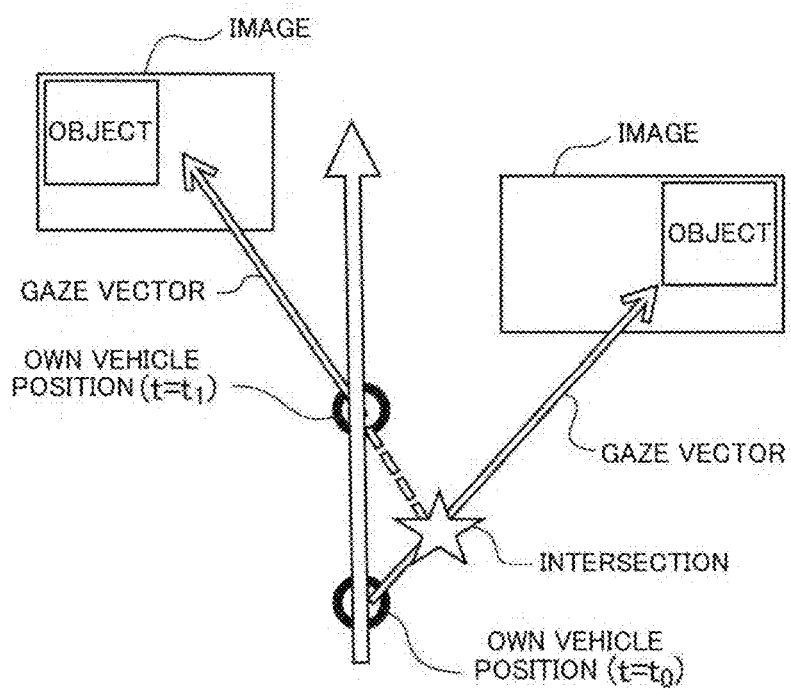
FIG. 12 is a diagram for describing a case where an intersection of gaze vectors in an observation pair is located behind.

The observation pair generation unit 24 generates, for each trip that is movement in a predetermined section, on the basis of the name of an object detected from each image, a pair of images in which the same object appears as an observation pair. In this case, in PTL 1, only an observation pair having a large value of HDOP is removed, but in the present embodiment, an observation pair in which an angle of intersection of gaze vectors in triangulation illustrated in FIG. 11 is acute is also removed. This is because when the angle of intersection is acute, there is a high possibility that measurement by triangulation becomes impossible, such as in traffic jams, when the vehicle is stopped, or when objects are captured in the center of the image. In addition, as illustrated in FIG. 12, when the gaze vectors for the matched objects are calculated from the position of the vehicle 4, the sign of the gaze vectors is negative between the observation pairs, that is, observation pairs that are formed for objects located on the left and right sides of the road in the direction of travel from the position of the vehicle 4 are eliminated. Such observation pairs are generated due to errors in image matching, but when triangulation is performed, the vector intersection of the observation pairs is created behind the direction of travel, and position estimation cannot be performed properly.

The position estimation unit 25 estimates, for each trip that is movement in a predetermined section, from each observation pair, a coordinate candidate point indicating the position of an object by using triangulation based on position information and a detection result of the object.

Note that the description has been made on the assumption that the method until the estimation of the coordinate candidate point is the same as the method disclosed in PTL 1, but the configuration of the present disclosure is not limited to this method. Another method may be used as long as a coordinate candidate point of an object is estimated by using an image from an on-vehicle camera and position information on the vehicle 4 when the image is taken.

In order to remove a trip whose position information has an error, the position determination unit 26 maps coordinate candidate points indicating positions of an object obtained for trips onto a predetermined space. The position determination unit 26 evaluates, for each trip, on the basis of a mapped coordinate candidate point, whether position information used to estimate the coordinate candidate point has an error caused by any of the position of a GPS satellite used to determine the position information, the position of the vehicle 4 in a real space when the position information is determined, or the vehicle 4 itself or does not have any error caused by any of the position of the GPS satellite, the position of the vehicle 4, or the vehicle 4. The position determination unit 26 determines a final output value of the position of the object on the basis of coordinate candidate points from which a coordinate candidate point belonging to a trip evaluated to have an error has been removed, and stores the final output value in the final data storage unit 35. As the predetermined space, for example, a three-dimensional space formed of an X axis, a Y axis, and a Z axis can be used.

In this manner, the final output value of the position of the object to be finally output can be determined while considering the degree of density of the remaining coordinate candidate points after excluding the coordinate candidate points with low reliability while referring to the distribution of the coordinate candidate points. In this case, the position determination unit 26 can also calculate reliability of the calculated final output value of the position of the object.

The output control unit 27 performs processing for reading the final output value indicating the position of the object stored in the final data storage unit 35, and outputting the read final output value to the outside through the input/output interface unit 10.

Figure 4:
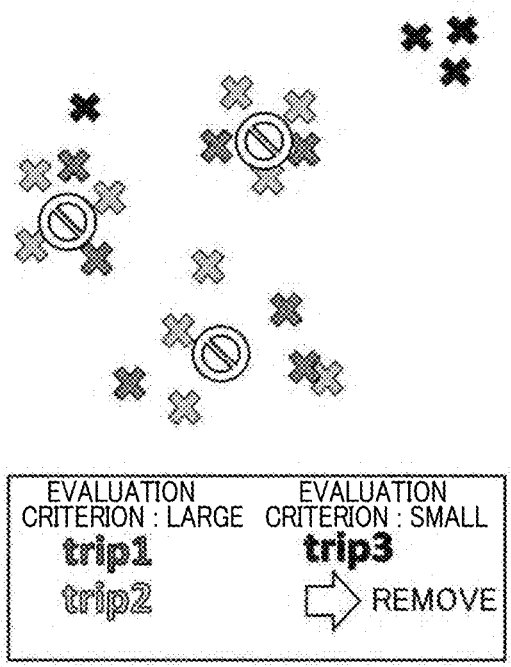
FIG. 4 is a diagram illustrating a distribution of position candidate points for each trip.
Figure 5:
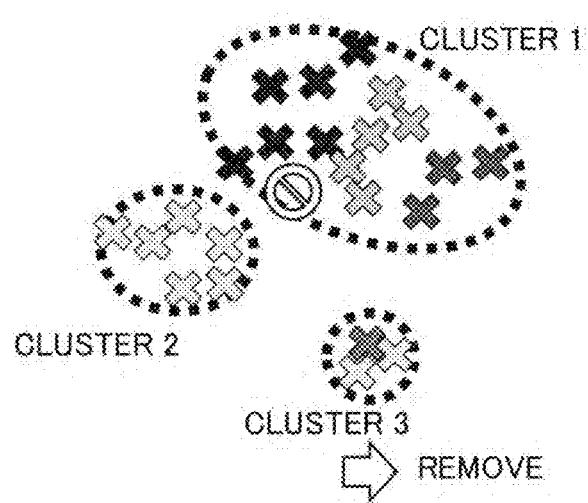
FIG. 5 is a diagram illustrating an example of a clustering result of position candidate points.
Figure 6:
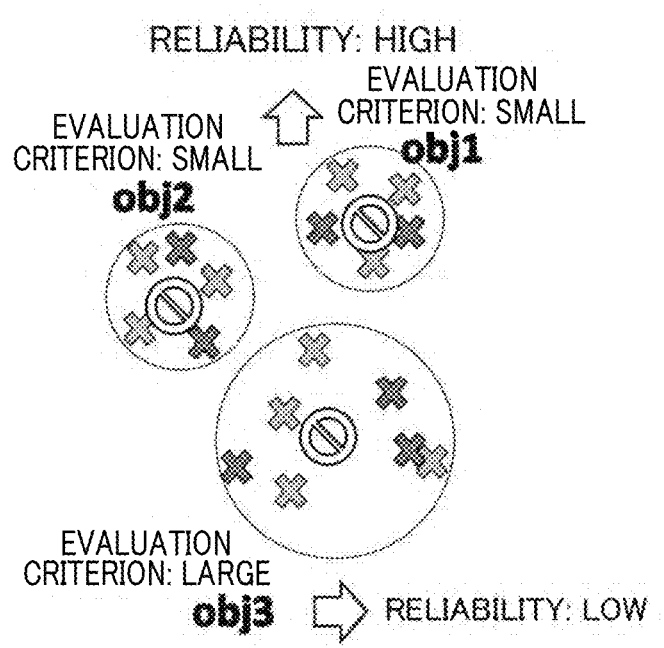
FIG. 6 is a diagram illustrating a distribution of position candidate points for each object.

Next, detailed processing in the position determination unit 26 is described. FIG. 4 to FIG. 6 are diagrams illustrating the outline of the processing in the position determination unit 26.

First, the position determination unit 26 removes, from a coordinate candidate point group estimated by the position estimation unit 25, in units of trips, a coordinate candidate point estimated at the trip where the estimation result or position information is evaluated to have an error (see FIG. 4). In this case, the coordinate candidate point groups estimated from the position information and images acquired on the trip are removed together and are excluded when calculating the final output value.

Alternatively, the position determination unit 26 can use a point cloud unit consisting of coordinate candidate points that are considered to be estimating the same object in a trip, and remove the coordinate candidate point estimated in the combination of trip and object where the estimation result or position information is evaluated to have an error. The point cloud unit consisting of coordinate candidate points that are considered to be estimating the same object within a trip is also referred to as "combination of trip and object". The combination of a trip and an object estimated within that trip is also referred to as "combination of a trip and an object". Among the coordinate candidate point groups estimated from the location information and images acquired in the trip, the coordinate candidate point groups estimated for the object in question are removed together and are excluded when calculating the final output value.

After that, the position determination unit 26 performs clustering processing on the coordinate candidate points that have not been excluded from the group of coordinate candidate points estimated from a plurality of trips (see FIG. 5). In this clustering processing, the coordinate candidate points that are estimated for the same object among the coordinate candidate point groups are discriminated, and then the outliers are excluded. The mean or median value of the coordinate candidate points for each object that are not excluded in the clustering process is used as the final output value for each object.

Finally, the position determination unit 26 performs reliability calculation to calculate reliability of the final output value and output the calculated reliability together with a final result (see FIG. 6).

FIG. 4 illustrates an example in which an evaluation criterion that has a negative correlation with the error with the correct coordinate is selected among several evaluation criteria described below. The distribution of coordinate candidate points indicated by the color-coded X mark for each of the three trips trip1 to trip3 indicates an example of removing coordinate candidate points estimated in trip3 with small evaluation criteria.

FIG. 6 illustrates an example in which an evaluation criterion that is positively correlated with the error with the correct coordinates is selected among the multiple evaluation criteria described below. FIG. 6 also illustrates an example where low reliability is calculated for the coordinate candidate points estimated for object3 having a large evaluation criterion according to the distribution of the circled coordinate candidate points estimated for each of the three objects obj1 to obj3 that is selected among the group of coordinate candidate points estimated from a plurality of trips. Further, an example where high reliability is calculated for the coordinate candidate points estimated for object1 and object2, which have small evaluation criteria, is illustrated.

FIG. 5 illustrates an example of the clustering results when hard clustering is selected among the two clustering methods described below.

Functions of Position Estimation Device According to Present Embodiment

Figure 7:
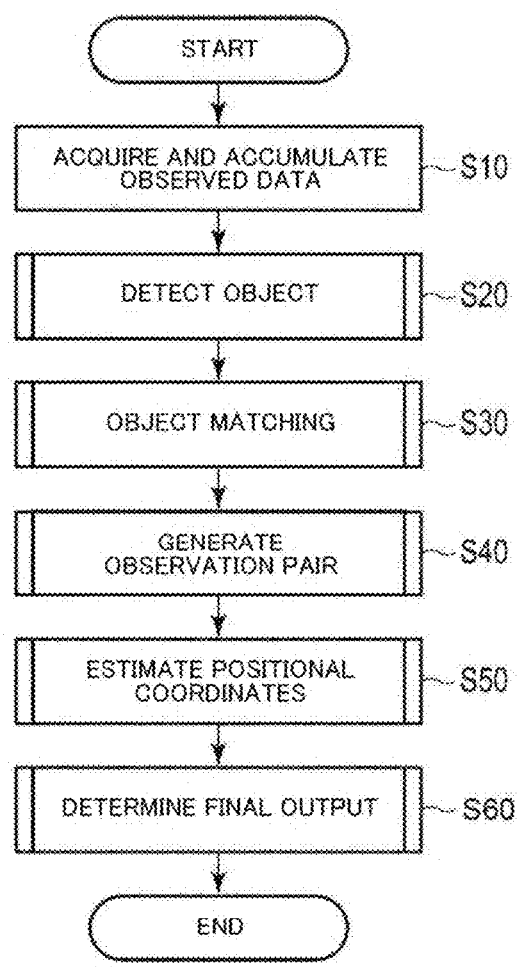
FIG. 7 is a flowchart illustrating the flow of position estimation processing in the present embodiment.

Next, functions of the position estimation device 1 are described. FIG. 7 is a flowchart illustrating the flow of position estimation processing by the position estimation device 1. The position estimation processing is performed when the processor 20A reads a position estimation program from the data memory 30, and deploys the position estimation program onto the program memory 20B to execute the position estimation program. Images and position information obtained when the vehicle 4 moves in a predetermined section a plurality of times while sensing are input to the position estimation device 1.

In Step S10, the processor 20A as the observed data acquisition unit 21 acquires an image and position information through the input/output interface unit 10 as observed data, and stores the image and the position information in the observed data storage unit 31. It is assumed here that, as the image, an image ahead of the traveling vehicle 4 taken by the camera 2 of the vehicle 4 is acquired.

For example, in the image, in addition to the road on which the vehicle 4 is traveling, white lines drawn on the road, sidewalks, surrounding buildings, traveling vehicles in front of the vehicle, parked vehicles, etc., signboards and signs are captured as examples of objects. The position information can include information on a time at which GPS measurement was performed, measured position information, and information indicating likelihood of the GPS measurement. The position information is acquired as values of the latitude and longitude.

In this case, the image and the position information are measured at a time interval of about at least 1 second with time synchronization at a granularity of 1 second. Images are accumulated in the observed data storage unit 31 in association with corresponding position information. Note that, when an input image is a moving image, still images taken for frames are accumulated in the observed data storage unit 31.

Figure 8:
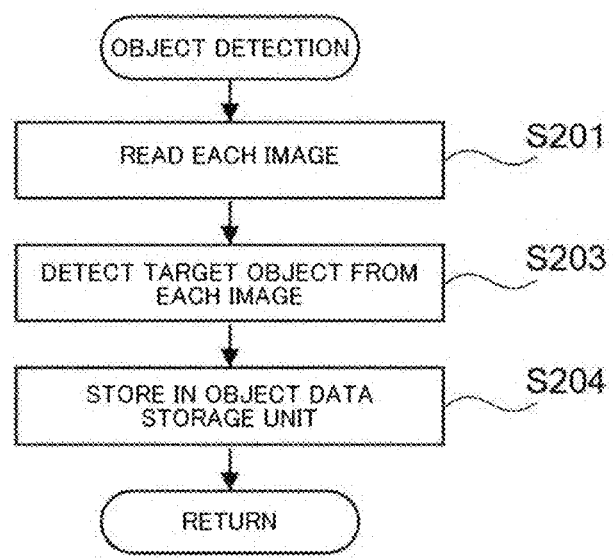
FIG. 8 is a flowchart illustrating the flow of object detection processing in the present embodiment.

In Step S20, the processor 20A performs object detection processing as the object detection unit 22. FIG. 8 is a flowchart illustrating an example of a processing procedure and processing contents performed by the object detection unit 22.

First, in Step S201, the object detection unit 22 reads each image from the observed data storage unit 31. In the image, photographing times are held in units of seconds.

In Step S203, the object detection unit 22 performs processing for detecting an object from each image. This processing can be performed by using a method such as Yolov2 (object detection algorithm) (see, for example, https://arxiv.org/abs/1612.08242). Note that, when a plurality of objects are present in a single image, the plurality of objects are detected.

In Step S204, the object detection unit 22 performs processing for storing a detection result in the object data storage unit 32. For example, the object detection unit 22 can provide box information indicating the detected object to the image, and store the resultant in the object data storage unit 32. Note that the image from which the object has been detected is stored in the object data storage unit 32 in association with the position information.

As an example, a case is considered in which position coordinates of a sign in a city are estimated. The object detection unit 22 detects a sign by object detection, and rectangular information is recorded for the detected sign. A target object is not limited to a sign, and may be a signboard, an on-street parked vehicle, and an automatic vending machine.

Figure 9:
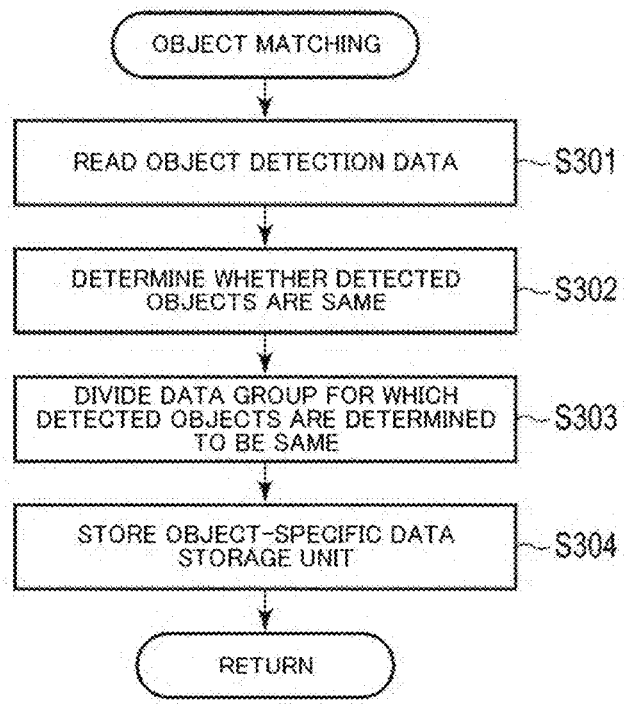
FIG. 9 is a flowchart illustrating the flow of object matching processing in the present embodiment.

In Step S30, the processor 20A as the object matching unit 23 performs, for each trip that is movement in a predetermined section, object matching processing on the basis of position information obtained in the trip and an image after object detection. FIG. 9 is a flowchart illustrating an example of a processing procedure and processing contents performed by the object matching unit 23. The object matching processing in FIG. 9 is executed for each trip.

First, in Step S301, the object matching unit 23 reads, from the object data storage unit 32 in the data memory 30, images after object detection that have been obtained for a trip to be processed.

Next, in Step S302, the object matching unit 23 performs processing for determining, for a trip to be processed, whether objects detected in the images are the same. In the determination processing, for example, whether a desired object is captured in the image in which the object is detected to be captured, the name of each object is detected, and whether the objects detected in each image are the same is determined on the basis of the name of the object.

In Step S303, the object matching unit 23 divides, for a trip to be processed, pieces of observed data including images determined to have the same object as an observed data group for the same object. As an example, after detecting a sign in a city, the object matching unit 23 performs processing for searching whether the same sign has been detected in another frame of the same vehicle 4, or whether the same sign has been detected in an image captured by another vehicle 4, and the observed data group is divided for each observed data containing the image determined to be the same sign.

In Step S304, the object matching unit 23 stores, for a trip to be processed, a division result in the object-specific data storage unit 33 in the data memory 30. For example, the same sign is detected in a plurality of images, and rectangular information is provided. Images divided for each object are stored in the object-specific data storage unit 33 in association with position information.

Figure 10:
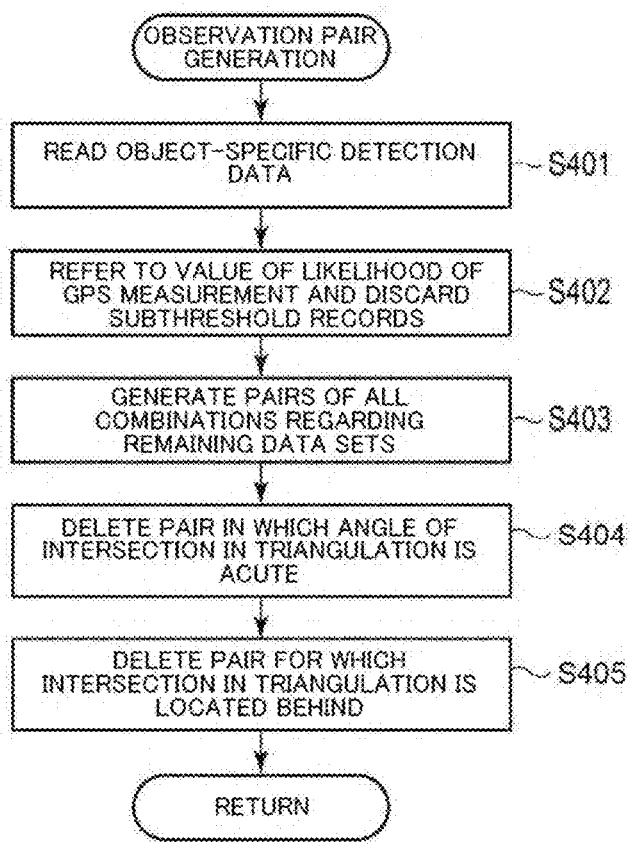
FIG. 10 is a flowchart illustrating the flow of observation pair generation processing in the present embodiment.

In Step S40, the processor 20A as the observation pair generation unit 24 performs observation pair generation processing for each trip. FIG. 10 is a flowchart illustrating an example of a processing procedure and processing contents performed by the observation pair generation unit 24, and the observation pair generation processing is repeated for each trip.

First, in Step S401, the observation pair generation unit 24 reads, for a trip to be processed, an observed data group divided for each object that is stored in the object-specific data storage unit 33 in the data memory 30. In this case, the observation pair generation unit 24 may read observed data groups for all detected objects, or may read an observed data group for a particular object.

Next, in Step S402, the observation pair generation unit 24 performs processing for determining observed data having more precise position information before generating an observation pair from at least two images in which the same object appears. In this case, by using the fact that an index indicating the likelihood of GPS measurement has been simultaneously measured, the observation pair generation unit 24 generates an observation pair of pieces of observed data having high likelihood. For example, the observation pair generation unit 24 refers to values in a column indicating the likelihood of GPS measurement from GPS information at each time in observed data groups, and discards observed data having low likelihood, thereby generating an observation pair from among observed data having high likelihood.

Examples of the index indicating likelihood include an index that takes the arrangement of GPS satellites into consideration. It is known that a position calculation error of a GPS receiver is different depending on the relative relation between the arrangement of GPS satellites and the location of the GPS receiver. The degree of decrease in precision depending on the arrangement of GPS satellites with respect to a measurement point as described above is called "geometric dilution of precision (GDOP)", and DOP in the horizontal direction therefrom is called "horizontal dilution of precision (HDOP)". A larger value of HDOP means a worse position measurement precision in the horizontal direction. For example, when HDOP is employed as an index indicating likelihood, observed data whose value of HDOP is higher than a threshold indicates the possibility that the precision of measured latitude and longitude is low. Thus, the corresponding observed data can be deleted.

Next, in Step S403, the observation pair generation unit 24 generates observation pairs for calculating position coordinates from among the remaining observed data. Regarding the remaining observed data, the observation pair generation unit 24 may generate all combinations of observed data as observation pairs. In this case, a threshold value may be set for the value of HDOP, or the data may be included in the top level of accuracy (low HDOP value) as a percentage of all observed data.

Next, in Step S404, the observation pair generation unit 24 calculates, for each of the generated observation pairs, an intersection of straight lines obtained by extending gaze vectors for the same object from the position of the vehicle 4, and removes an observation pair in which the angle of intersection is acute. FIG. 11 illustrates an example in which the observation pair generation unit 24 determines an angle of intersection of gaze vectors in an observation pair of an image at a time t=0 and an image at a time t=1. With position coordinates of an object being (x, y, z), a straight line obtained by extending a gaze vector (vx0, vy0, vz0) from a position (x0, y0, z0) of the vehicle 4 at the time t=0 toward a position (x0', y0', z0') of the object determined from image coordinates of the object on the image is illustrated. A straight line obtained by extending a gaze vector (vx1, vy1, vz1) from a position (x1, y1, z1) of the vehicle 4 at the time t=1 toward a position (x1', y1', z1') of the object determined from image coordinates of the object on the image is illustrated. An angle of intersection of the straight lines is Θ.

Next, in Step S405, the observation pair generation unit 24 removes, from the remaining observation pairs, an observation pair in which an intersection of gaze vectors for triangulation is located behind (see FIG. 12). FIG. 12 illustrates an example in which an intersection of gaze vectors in an observation pair of an image at a time t=t0 and an image at a time t=t1 is located behind an own vehicle position at the time t=t1.

Figure 13:
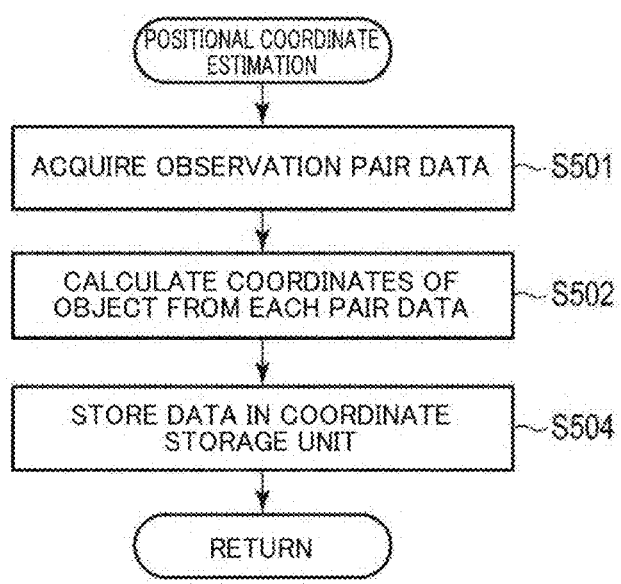
FIG. 13 is a flowchart illustrating the flow of position coordinate estimation processing in the present embodiment.

In Step S50, the processor 20A as the position estimation unit 25 performs position estimation processing for each trip. FIG. 13 is a flowchart illustrating an example of a processing procedure and processing contents performed by the position estimation unit 25, and the position estimation processing is repeated for each trip.

First, in Step S501, the position estimation unit 25 acquires, for a trip to be processed, observation pairs generated by the observation pair generation unit 24.

Next, in Step S502, the position estimation unit 25 calculates position coordinates of an object by using each observation pair. Specifically, the position estimation unit 25 calculates, for each image in the observation pair, a gaze vector from the position of the vehicle 4 obtained from the position information toward the object, calculates an intersection of straight lines obtained by extending gaze vectors obtained for the images, and sets the intersection as position coordinates of the object.

Next, in Step S504, the position estimation unit 25 stores the calculated position coordinates of the object in the coordinate data storage unit 34. In this case, the position coordinates are stored in association with an image including the corresponding object.

Figure 14:
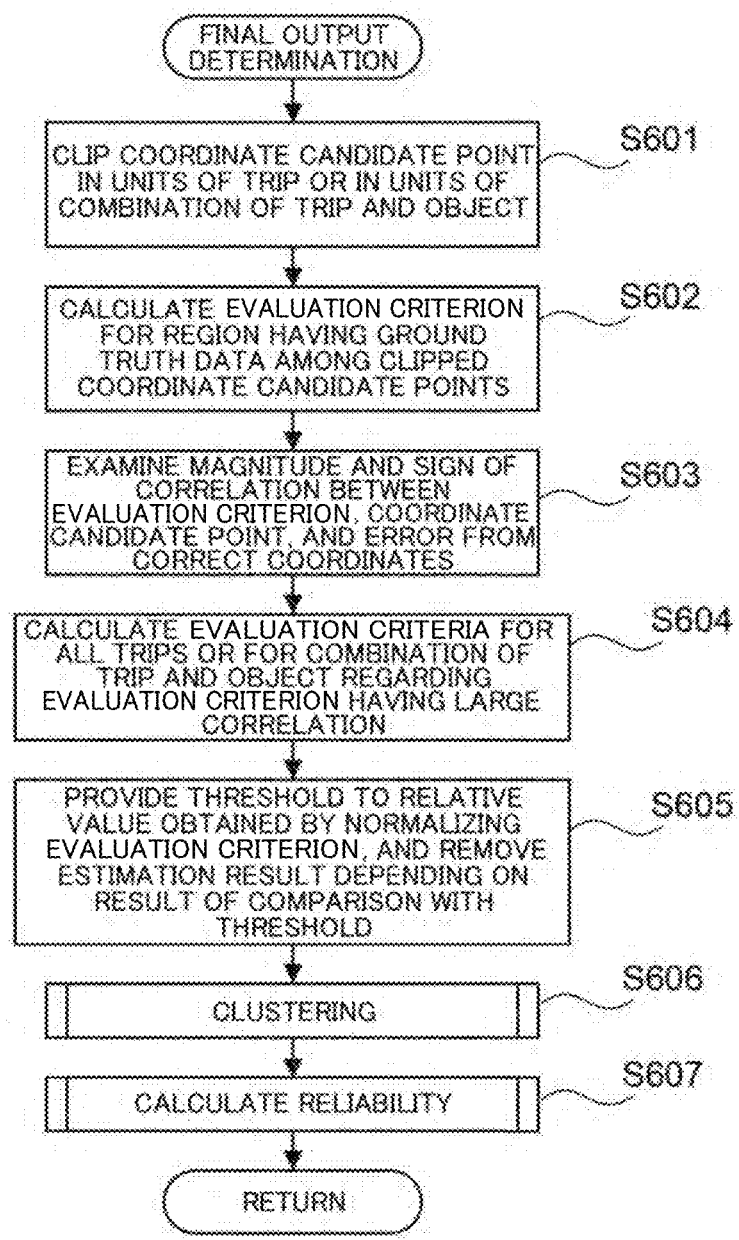
FIG. 14 is a flowchart illustrating the flow of final output determination processing in the present embodiment.

In Step S60, the processor 20A performs final output determination processing as the position determination unit 26. FIG. 14 is a flowchart illustrating an example of a processing procedure and processing contents performed by the position determination unit 26.

First, in Step S601, the position determination unit 26 reads coordinate candidate point groups of position coordinates of an object estimated through a plurality of trips from the coordinate data storage unit 34. The position determination unit 26 divides the read coordinate candidate point groups into coordinate candidate point groups estimated in the same trip, on a trip-by-trip basis, on the basis of which trip's position information and image it was estimated from. Alternatively, the position determination unit 26 divides the loaded coordinate candidate point group into a group of coordinate candidate points estimated for the object in the same trip, in units of trip and object combination, on the basis of which trip's location information and image it was estimated from, and the name of the object. In the case where there are plurality of objects of the same type, such as plurality of no-parking signs in a trip, the position determination unit 26 may identify which object was captured in each image after clustering.

The next Steps S602 and S603 are executed for coordinate candidate points belonging to a region on a map for which ground truth data on position coordinates of each object is required by a highly precise measurement device. In the following, an example in which coordinate candidate point groups are divided in units of trips is described. When coordinate candidate point groups are divided in units of combinations of a trip and an object, "trip" is read as "combination of trip and object".

In Step S602, the position determination unit 26 calculates, for each trip, six evaluation criteria for a coordinate candidate point group in a region having ground truth data among coordinate candidate point groups for the trip.

For example, as the first evaluation criteria, the position determination unit 26 calculates a value of a covariance of coordinates for a coordinate candidate point group in a region having ground truth data. As the second evaluation criterion, the position determination unit 26 calculates an absolute value of the covariance of the coordinates for the coordinate candidate point group in the region having ground truth data. As the third evaluation criterion, the position determination unit 26 calculates the number of times corresponding to predetermined estimation failure conditions that define conditions where the estimation of the position of a position estimation target fails. The estimation failure conditions includes: the distance between the position information when the images of the observation pair were acquired and the position information when the image one frame later was acquired for calculating the movement vector was acquired was closer than 0.01 m; the Euclidean distance between the position information when each image of the observation pair was acquired was greater than 999 m; the distance between the estimated position of the target and the position of the own vehicle is farther than 20 m; and the parameter value when the vectors in the image are converted to coordinates in the ground coordinate system is negative and cannot be converted properly. Note that the above-mentioned numerals are examples, and the design can be changed as appropriate.

As the fourth evaluation criterion, the position determination unit 26 calculates a distance between two farthest coordinates in the coordinate candidate point group in the region having ground truth data. As the fifth evaluation criterion, the position determination unit 26 calculates a value of a determination coefficient when plurality of regression analysis is applied to the coordinate candidate point group in the region having ground truth data. As the sixth evaluation criterion, the position determination unit 26 calculates the larger of the eigenvalues of the covariance matrix created for the coordinate candidate point group in the region having ground truth data.

The case where the position determination unit 26 calculates the evaluation criteria in units of trips has been described above as an example, but the embodiment is not limited thereto. The position determination unit 26 may calculate evaluation criteria in units of combinations of a trip and an object, and take an average of evaluation criteria for objects in the same trip.

Subsequently, in Step S603, the position determination unit 26 calculates, for each trip, an error average from correct coordinates for a coordinate candidate point group in the region having ground truth data among coordinate candidate point groups for the trip. In the calculation of the error, the position determination unit 26 calculates an error from correct coordinates for a coordinate candidate point that have the same object name as the correct answer coordinates. For each trip, the position determination unit 26 calculates an evaluation criterion, which is the correlation between the average error between the correct answer coordinates and the value of the evaluation criterion obtained above for the group of coordinate candidate points in the area with the ground truth data. The position determination unit 26 repeats this calculation of the evaluation criterion for each type of evaluation criterion. If there are two or more objects of the same type in a single trip, the position determination unit 26 may use the one with the shortest distance from the coordinate candidate point among the plurality of correct coordinates as the correct coordinate.

For example, as illustrated in FIG. 15, the position determination unit 26 calculates an evaluation criterion for each trip, and generates an array of evaluation criteria. The position determination unit 26 further calculates an error average between a coordinate candidate point calculated for each trip and correct coordinates, and generates an array of error averages. The position determination unit 26 inputs the two arrays to examine the value of a correlation coefficient and the sign thereof. FIG. 15 illustrates an example in which the evaluation criterion is 20 and the error average is 3 [m] in the trip Trip1 and the evaluation criterion is 50 and the error average is 5 [m] in the trip Trip2.

Subsequently, in Step S604, the position determination unit 26 selects an evaluation criterion with which the absolute value of the correlation coefficient is the largest as an evaluation criterion to be employed for subsequent final output determination processing. The position determination unit 26 calculates, for each trip, the selected evaluation criterion for all coordinate candidate points for each trip, regardless of whether or not there is correct data, and then creates a normalized array so that the minimum value among all trips is 0 and the maximum value is 1. Note that the position determination unit 26 may select an evaluation criterion with which the absolute value of the correlation coefficient is equal to or more than a predetermined threshold instead of selecting an evaluation criterion with which the absolute value of the correlation coefficient is the largest. In this case, among the plurality of selected evaluation criteria, the one with the most improved accuracy in the area with the ground truth data should be finally selected.

When the position determination unit 26 divides the coordinate candidate point group into units of combinations of trips and objects in Step S601, the position determination unit 26 calculates the selected evaluation criterion for all coordinate candidate points regardless of the presence or absence of ground truth data for each combination of trips and objects, and creates a normalized array so that the minimum value is 0 and the maximum value is 1 among all combinations of trips and objects.

Subsequently, in Step S605, the position determination unit 26 provides a threshold for the normalized evaluation criterion, and when there is a positive correlation between an error average from correct coordinates and an evaluation criterion, removes a trip whose evaluation criterion is larger than the threshold in subsequent clustering processing for calculating a final output value of position coordinates. Alternatively, when there is a negative correlation, the position determination unit 26 removes a trip whose evaluation criterion is smaller than the threshold in the subsequent clustering processing for calculating a final output value of position coordinates.

In the case where the position determination unit 26 divides, in Step S601, coordinate candidate point groups in units of combinations of a trip and an object, when there is a positive correlation, the position determination unit 26 removes a combination of a trip and an object whose evaluation criterion is larger than the threshold in the subsequent clustering processing for calculating a final output value of position coordinates. Alternatively, there is a negative correlation, the position determination unit 26 removes a combination of a trip and an object whose evaluation criterion is smaller than the threshold in the subsequent clustering processing for calculating a final output value of position coordinates.

In the above-mentioned example in FIG. 4, the trips trip1 and trip2 whose evaluation criteria having a negative correlation with an error are large proceeds to the subsequent clustering processing, and the trip trip3 whose evaluation criterion is small is removed without proceeding to the subsequent clustering processing. For trips that frequently have problems estimating coordinate candidate points due to GPS errors, excessive vehicle speed, or other reasons, there are characteristics that the types of objects that can be estimated are few and the number of coordinate candidate points are small. Here, it is assumed that the evaluation criteria reflecting such characteristics are selected. Specifically, an example is assumed in which the larger of the eigenvalues of the covariance matrix is selected as the evaluation criterion. Here, the eigenvalues reflect the variability, and hence this evaluation criterion evaluates that the variability of the coordinate candidate points is small, that is, the number of objects that could be estimated is small.

In Step S606, the position determination unit 26 performs clustering processing.

Here, when calculating the final output value of position coordinates for each object after considering all the coordinate candidate points calculated from plurality of trips, if the mean or median value of the coordinate candidate points is simply calculated, the resultant is affected by outliers such as GPS errors. Therefore, outliers are excluded by statistical processing. In the present embodiment, two kinds of a method using hard clustering and a method using kernel density estimation are described as methods for the statistical processing.

Figure 16:
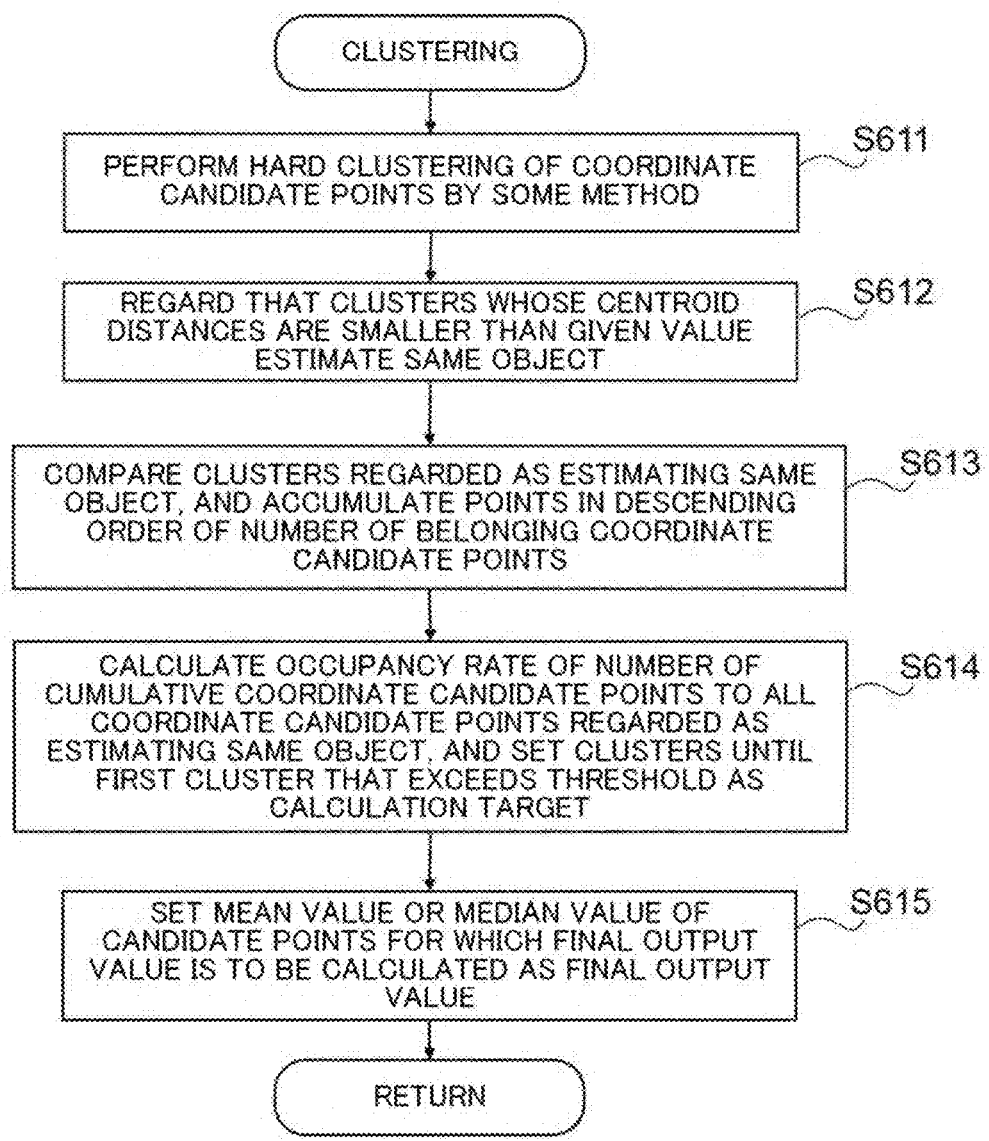
FIG. 16 is a flowchart illustrating the flow of clustering processing in the present embodiment.

First, the method using hard clustering is described. FIG. 16 is a flowchart illustrating an example of a processing procedure and processing contents of clustering processing using hard clustering performed by the position determination unit 26.

First, in Step S611, the position determination unit 26 performs hard clustering on a coordinate candidate point group estimated for a plurality of trips by using the conventionally known method. For example, the position determination unit 26 sorts coordinate candidate points in the order of latitude and longitude, and determines cluster centroids in ascending order of latitude and longitude. The position determination unit 26 refers to the other coordinate candidate points in order of decreasing latitude and longitude, and if the points are closer to the center of gravity than a certain distance, it is considered that the points belong to the same cluster, and if the points are farther away, it is considered that the points are the center of gravity of the next cluster, and repeats the same processing.

The position determination unit 26 finally updates the centroid position of each cluster to a mean value of coordinate candidate points belonging to the cluster.

Next, in Step S612, the position determination unit 26 calculates a distance between the centroids of the clusters, and regards that the clusters close at a given distance or less estimate the same object. In this case, not only can a threshold be set for the distance between the centers of gravity, but also if the number of coordinate candidate points belonging to a cluster is too small, it can be considered to be estimating the same object as a nearby larger cluster.

Subsequently, in Step S613, the position determination unit 26 compares the clusters that are regarded as estimating the same object, and accumulates the number of coordinate candidate points in descending order of belonging coordinate candidate points.

In Step S614, the position determination unit 26 calculates the occupancy rate of the cumulative number of coordinate candidate points relative to the total number of coordinate candidate points for which the same object is considered to be estimated. The cumulative occupancy rate is calculated for each additional cumulative cluster, and if the cumulative occupancy rate exceeds the threshold, the accumulation process is stopped. The coordinate candidate points belonging to the clusters up to the first cluster that exceeds the threshold are used to calculate the final output value of position coordinates.

Finally, in Step S615, the position determination unit 26 determines, for each object, a mean value or a median value of all coordinate candidate points for which final output values of position coordinates are to be calculated as a final output value of position coordinates.

Figure 17:
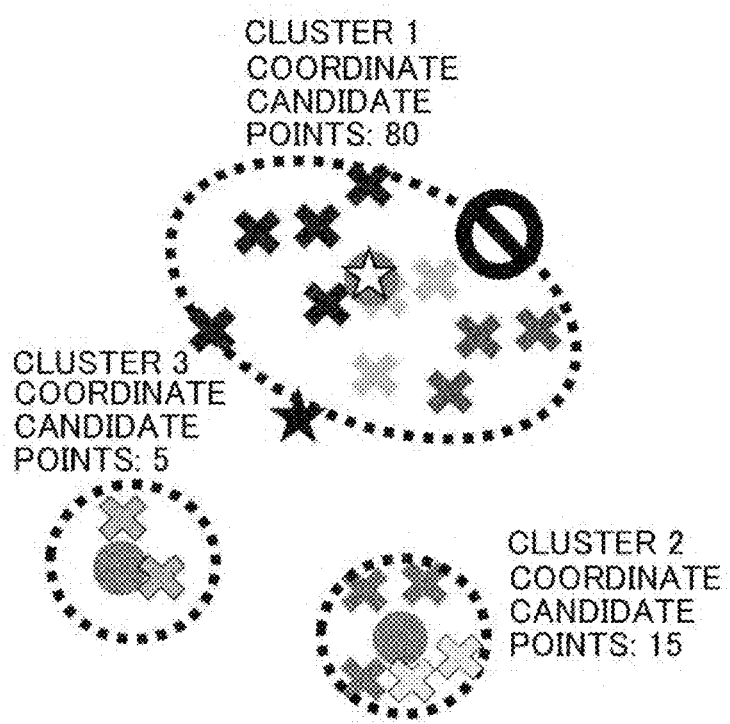
FIG. 17 is a diagram illustrating an example of position candidate points for each cluster.

FIG. 17 illustrates an image of outlier removal by hard clustering. It is assumed that all clusters 1, 2, and 3 in FIG. 17 have sufficient small distances between centroids and are regarded as estimating the same object. Among clusters 1, 2, and 3, the number of coordinate candidate points belonging to clusters 1, 2, and 3 is accumulated in the descending order of belonging coordinate candidate points, that is cluster 1, cluster 2, and cluster 3. The cumulative occupancy rate for all coordinate candidate points is obtained. As illustrated in FIG. 18, the number of coordinate candidate points belonging to the cluster 1 is 80 and the number of all coordinate candidate points is 100, and hence the cumulative occupancy until the cluster 1 is 0.8. 15 coordinate candidate points belong to the cluster 2, whose number of belonging coordinate candidate points is the second largest, and hence the cumulative occupancy until the cluster 2 is $95/100$, that is, 0.95. Finally, five coordinate candidate points belong to the cluster 3, and hence the cumulative occupancy until the cluster 3 is 1.0. Assuming that the threshold value of the cumulative occupancy rate to be used for calculating the final output value of the position coordinates without excluding it as an outlier is 0.7, the cumulative occupancy rate is already 0.8 at the time of cluster 1 and is larger than the threshold value 0.7. Thus, only the candidate points belonging to cluster 1 are employed for the calculation of the final output value of position coordinates, and all candidate points belonging to clusters 2 and 3 are excluded. If the average of all clusters 1, 2, and 3 is used as the final output value of the position coordinates, the black star in the figure becomes the final output value of the position coordinates. However, if clusters 2 and 3 are excluded and the average of the coordinate candidate points belonging to cluster 1 is used as the final output value of the position coordinates, the final output value of the position coordinates becomes a white star. In the case where the parking prohibition sign in the figure is the correct position, it can be seen that the final output value of the position coordinates output is closer to the correct answer by excluding outliers by clustering.

Note that the method used for hard clustering is not limited to the one described above. However, it is preferred to use a method with which it is unnecessary to determine the number of clustering in advance.

Figure 19:
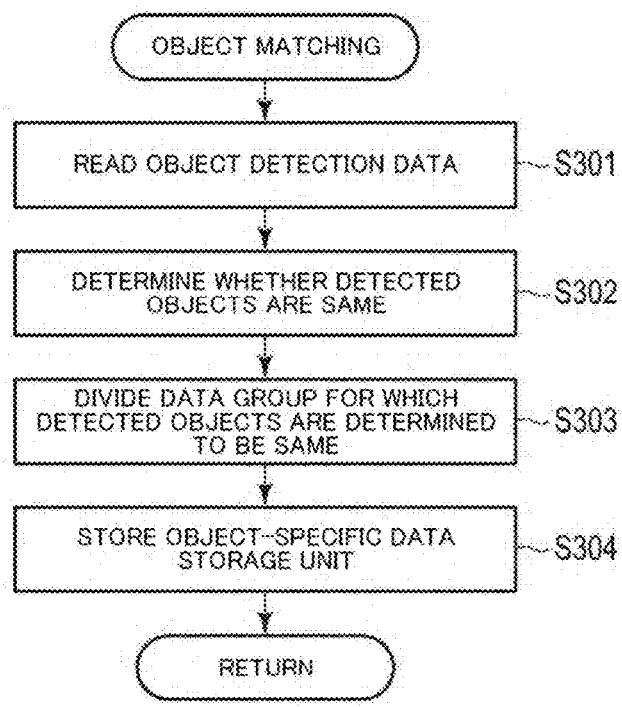
FIG. 19 is a flowchart illustrating the flow of clustering processing in another example of the present embodiment.

Next, a method using kernel density estimation is described. FIG. 19 is a flowchart illustrating an example of a processing procedure and processing contents of clustering processing using kernel density estimation performed by the position determination unit 26.

Figure 20:
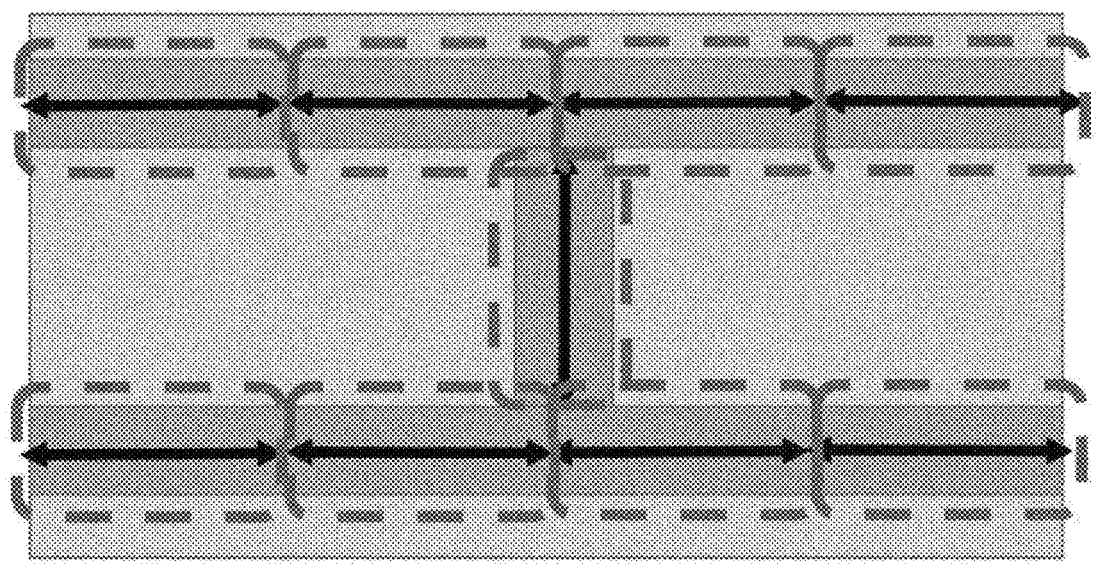
FIG. 20 is a diagram illustrating an example in which a region near a road on a map is sectioned into regions with given sizes.

First, in Step S621, the position determination unit 26 uses a road database (not shown) to cut out a road region on a map, and sections the cut road region into given sizes (see FIG. 20). FIG. 20 illustrates an example in which a region near roads on a map are sectioned into regions with given sizes enclosed by dotted lines.

Figure 21:
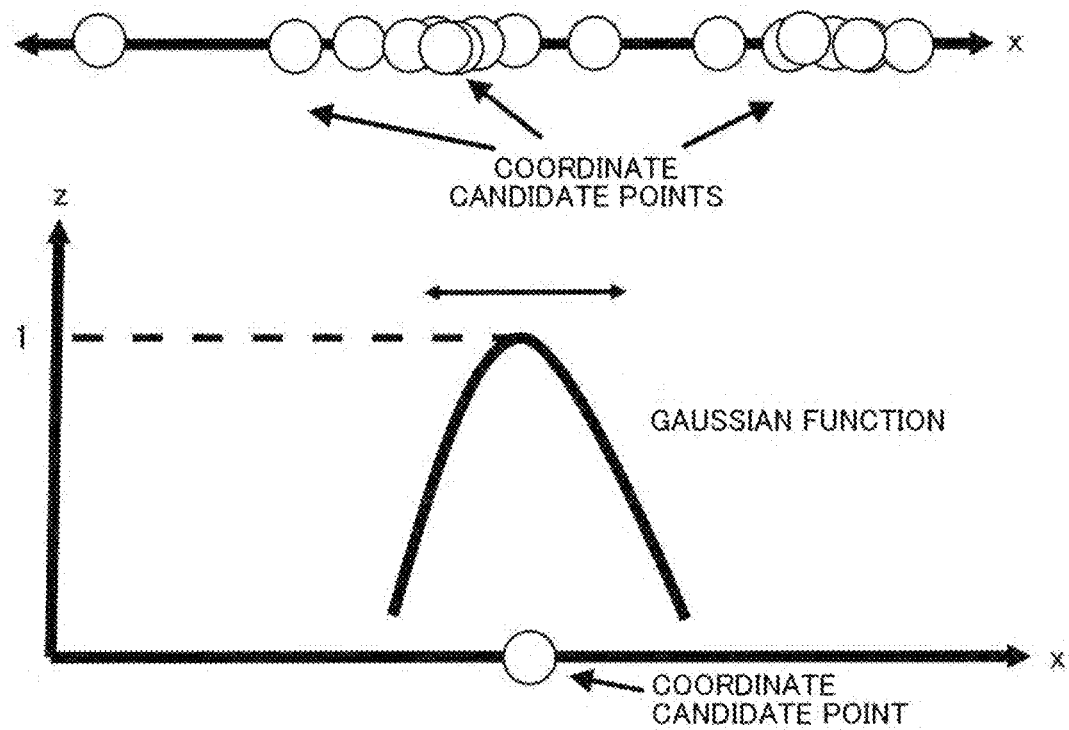
FIG. 21 is a diagram illustrating an example in which Gaussian functions indicating a density of coordinate candidate points are determined for one of a plurality of coordinate candidate points distributed on an x axis in a sectioned region.

Next, in Step S622, the position determination unit 26 determines a Gaussian function for each of coordinate candidate points in the regions sectioned in Step S621, and generates a Gaussian kernel (see FIG. 21). In this case, the magnitude of the spread of the Gaussian kernel is set as a hyperparameter. To simplify the description, only the x axis of coordinates of a coordinate candidate point and the density z of the kernel are used in the following, but in actuality, there are latitude and longitudes x and y and the z axis indicating density. FIG. 21 illustrates an example in which a Gaussian function indicating the density of a coordinate candidate point is determined for one of a plurality of coordinate candidate points distributed on the x axis in a sectioned region.

Figure 22:
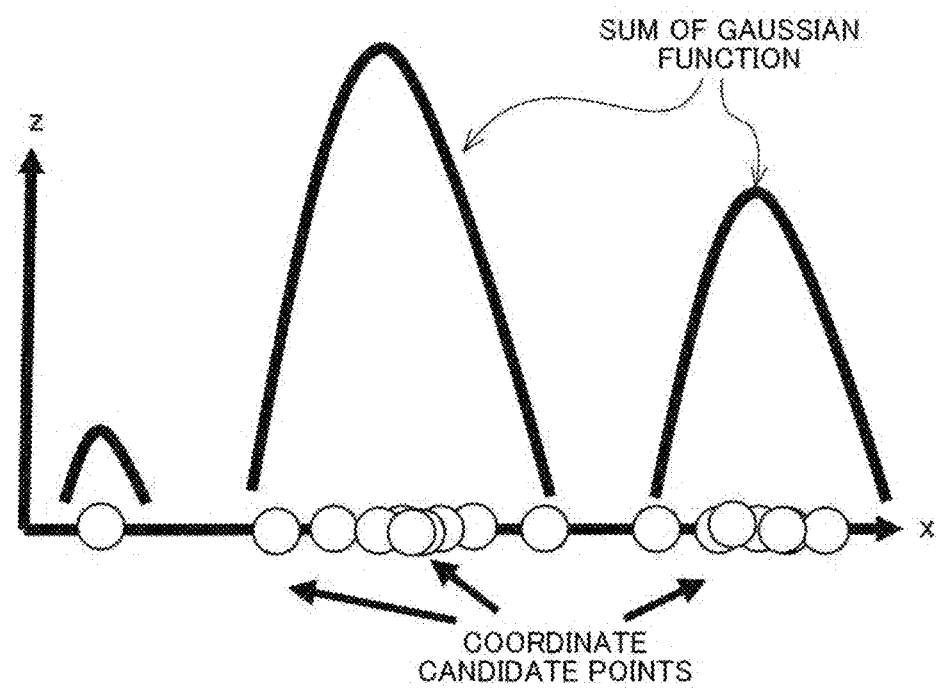
FIG. 22 is a diagram illustrating an example in which a sum of Gaussian functions determined for a plurality of coordinate candidate points distributed on an x axis in a sectioned region.

Next, in Step S623, the position determination unit 26 determines the sum of Gaussian functions of the coordinate candidate points determined in Step S622 (FIG. 22). The z value of the sum of the Gaussian functions corresponds to the magnitude of the density at the coordinate candidate points x, which means that the density is estimated. FIG. 22 illustrates an example in which the sum of Gaussian functions determined for the plurality of coordinate candidate points distributed on the x axis in a sectioned region.

Figure 23:
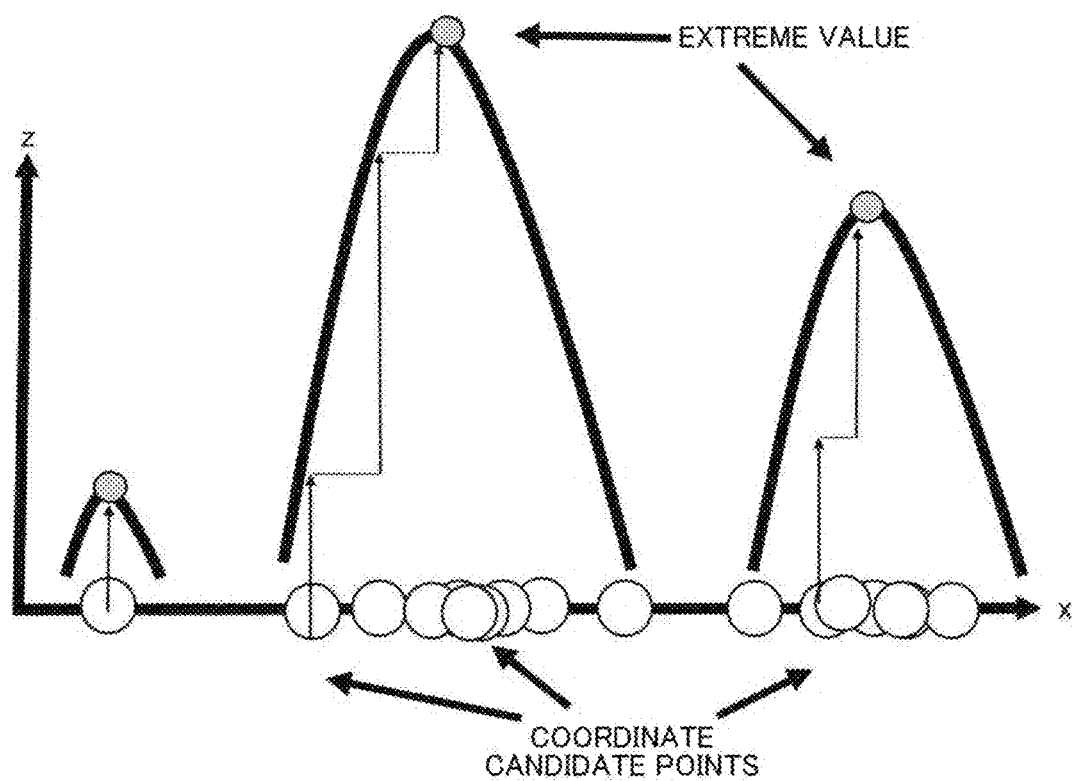
FIG. 23 is a diagram illustrating an example in which three extreme values indicated by circles are searched on a curve indicating the sum of Gaussian functions.

Next, in Step S624, the position determination unit 26 searches for each of extreme values of the sums of Gaussian functions determined in Step S623 (FIG. 23). FIG. 23 illustrates an example in which the extreme values indicated by the gray circles are searched for by moving each of the coordinate candidate points indicated by the white circles by a predetermined step width on the curve indicating the sum of the Gaussian functions.

Figure 24:
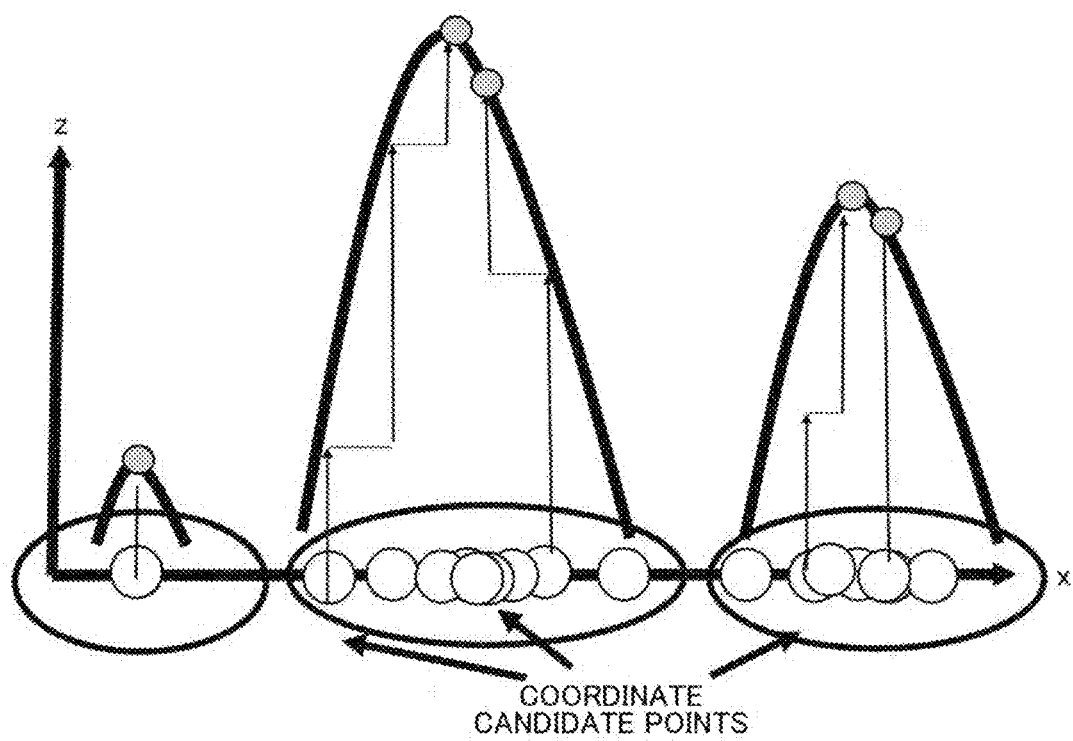
FIG. 24 is a diagram illustrating an example in which a pair of coordinate candidate points in which a distance between extreme values searched for the pair of coordinate candidate points is smaller than a threshold belong to the same cluster on a curve indicating the sum of Gaussian functions.

Next, in Step S625, the position determination unit 26 calculates a distance between the retrieved extreme values, and when the distance is smaller than a threshold, regards that a pair of the coordinate candidate points belong to the same cluster (FIG. 24). FIG. 24 illustrates an example in which if the distance in the x-axis direction between the extreme values indicated by the gray circles, which is searched by moving the pair of candidate points indicated by the white circles with the specified step width, is smaller than the threshold, the pair of candidate points is considered to belong to the same cluster.

Figure 25:
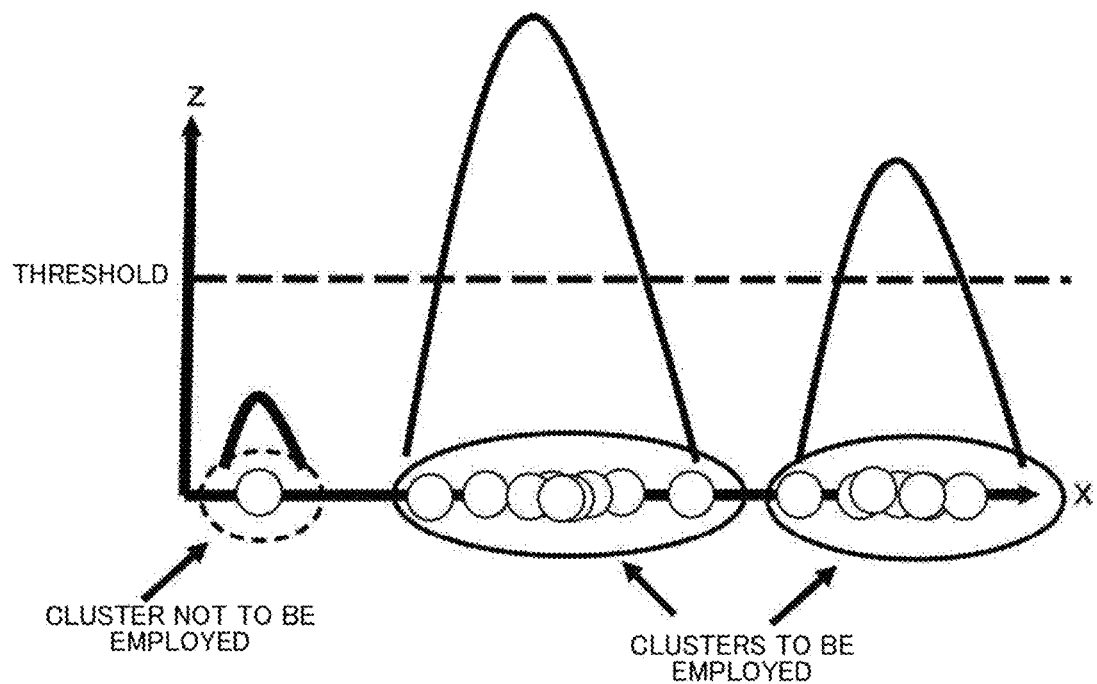
FIG. 25 is a diagram illustrating an example in which a cluster in which a z coordinate of an extreme value is smaller than a threshold is removed.

Next, in Step S626, when the z coordinate of an extreme value of a cluster is smaller than a threshold, the density of coordinate candidate points belonging to the cluster is low, and hence the position determination section 26 removes the cluster as an outlier (FIG. 25). FIG. 25 illustrates an example in which a cluster in which the z coordinate of the extreme value is smaller than the threshold among three clusters is removed. Note that it is desired that the threshold be a value proportional to the number of trips.

Figure 26:
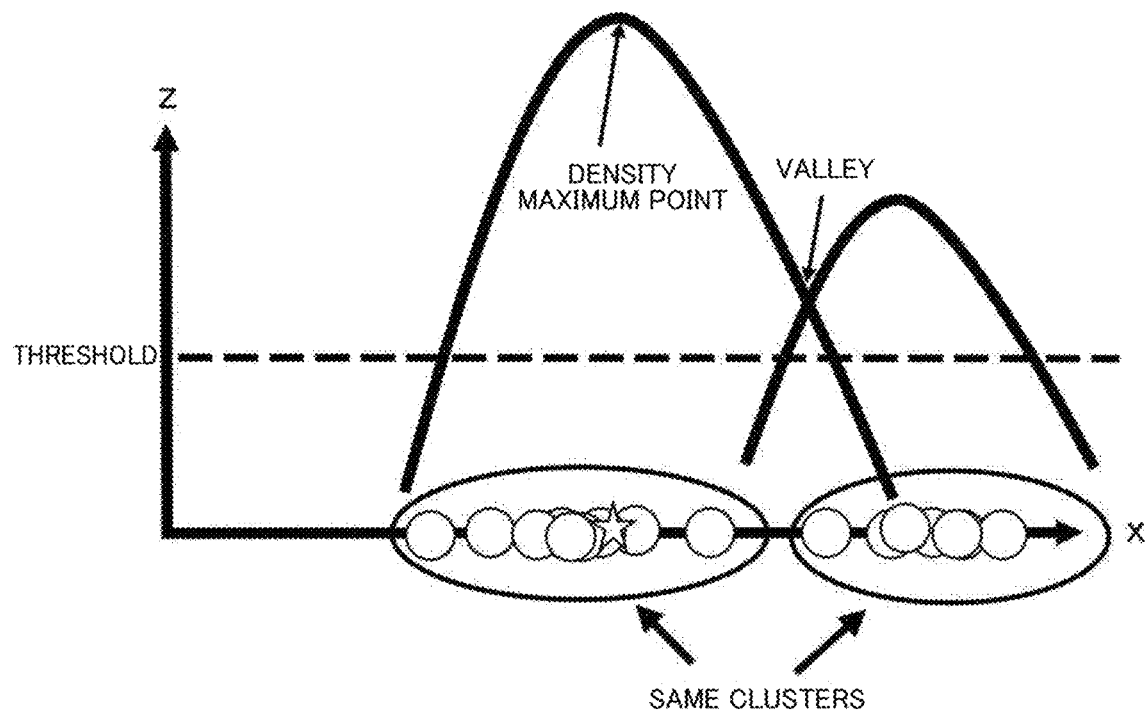
FIG. 26 is a diagram illustrating an example in which a z coordinate of a valley appearing between an extreme value and an extreme value of two clusters is larger than a threshold.

Next, in Step S627, the position determination unit 26 determines that if the distance between the extreme values and the extreme values was sufficiently close and between large clusters, the valley appearing between the extreme values is shallow, and if the z coordinate of this valley is larger than the threshold value, these clusters are considered to be the same cluster (FIG. 26). FIG. 26 illustrates an example of considering these two clusters to be the same cluster when the z coordinate of the valley appearing between the extreme values is greater than the threshold.

Next, in Step S628, the position determination unit 26 determines a mean value of coordinate candidate points belonging to each cluster or coordinates at which the density is maximum as a final output value of position coordinates. As the density maximum point of clusters that are equated in Step S627, a density maximum point of a cluster whose number of belonging candidate points before equation is larger is employed. Note that a value obtained by averaging density maximum points of equated clusters may be employed as a final output value of position coordinates.

In Step S607, the position determination unit 26 performs reliability calculation processing.

When estimating the position of an object, which is a surrounding object, from a vehicle or a ship, the accuracy may become extremely low for a specific object in common among plurality of trips due to certain circumstances, that is, the error with the correct position may become large. These circumstances include the following: the position information of the vehicle itself cannot be accurately obtained due to obstructions, the object to be estimated cannot be estimated because it is hidden by a preceding vehicle, or the pairing does not work due to excessive speed.

Thus, in the present embodiment, at a timing after statistical processing such as clustering is performed to determine a final output value of position coordinates, reliability calculation processing for calculating whether the reliability of the final output value of position coordinates of each object is high without referring to the position of correct coordinates is performed.

Figure 27:
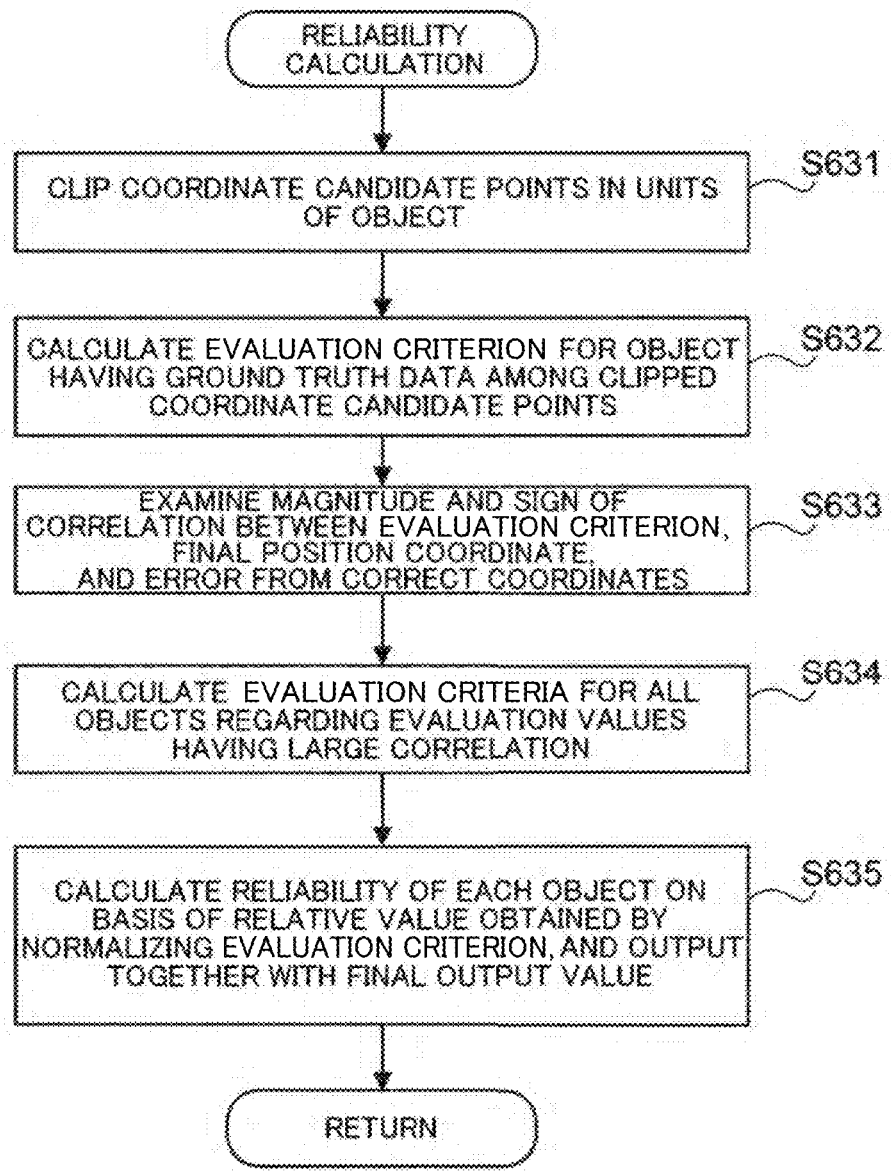
FIG. 27 is a flowchart illustrating the flow of reliability calculation processing in the present embodiment.

FIG. 27 is a flowchart illustrating an example of a processing procedure and a processing contents of the reliability calculation processing by the position determination unit 26.

Also in the reliability calculation processing, the selection of an evaluation criterion and the determination of the sign of correlation are performed by using a region on a map in which the correct position of an object has been determined.

First, in Step S631, the position determination unit 26 clips, for each object, coordinate candidate points that have been regarded in clustering to estimate the same object.

Next, in Step S632, the position determination unit 26 calculates six evaluation criteria for a coordinate candidate point group for the object in a region having ground truth data similarly to Step S602. In this case, the above-mentioned evaluation criterion selected in Step S604 is included.

In Step S633, the position determination unit 26 calculates, for each object, an error average from correct coordinates for a coordinate candidate point group in the region having ground truth data among coordinate candidate point groups for the object. The position determination unit 26 calculates, for each object, a correlation between the error average from the correct coordinates and the evaluation criterion determined in the above for the coordinate candidate point group in the region having ground truth data. The position determination unit 26 repeats the calculation of the correlation for each type of evaluation criteria.

For example, the position determination unit 26 calculates an evaluation criterion for each object, and generates an array of the evaluation criteria. The position determination unit 26 calculates an error average between the coordinate candidate points calculated for each object and the correct coordinate, and generates an array of error averages. The two arrays are input to examine the value of a correlation coefficient and the sign thereof.

Subsequently, in Step S634, the position determination unit 26 selects an evaluation criterion with which the absolute value of the correlation coefficient is the largest as an evaluation criterion to be employed in subsequent reliability calculation processing. Regardless of the presence or absence of ground truth data, the position determination unit 26 calculates the selected evaluation criterion for each of the coordinate candidate points of the object in question for each of all the objects, and normalizes the evaluation criteria calculated for each object so that the minimum value among all the objects is 0 and the maximum value is 1. Instead of taking the evaluation criterion with the largest absolute value of the correlation coefficient, the one whose absolute value of the correlation coefficient exceeds a predetermined threshold may be selected. In this case, among the plurality of selected evaluation criteria, the one with the most improved accuracy in the area with the ground truth data is finally selected.

Next, in Step S635, when there is a positive correlation between the error average from the correct coordinate and the evaluation criterion, the position determination unit 26 calculates reliability such that the reliability becomes lower as the evaluation criterion becomes larger, and when there is a negative correlation, calculates reliability such that the reliability becomes higher as the evaluation criterion becomes larger. The position determination unit 26 stores the reliability in the final data storage unit 35 in correspondence with the final output value of position coordinates.

FIG. 6 referred to above illustrates an image in which reliability calculated for each object is output. The example FIG. 6 indicates the case where the evaluation criterion in the reliability calculation processing has a positive correlation with an error from correct coordinates. Thus, high reliability is calculated for objects obj1 and obj2 whose evaluation criteria are small, and low reliability is calculated for an object obj3 whose evaluation criterion is large. The reliability is output together with the final output value of position coordinates.

After that, the output control unit 27 can read the determined final output value of position coordinates and the reliability from the final data storage unit 35, and output the final output value of position coordinates and the reliability to an external device through the input/output interface unit 10 in response to an operation from an operator, for example.

As described above, the position estimation device according to the present embodiment estimates, for each trip that is movement in a predetermined section, a plurality of position candidates for an object on the basis of position information and an image, evaluates, for each trip, whether an estimation result or position information has an error on the basis of a plurality of position candidates for the object obtained in the trip, and determines a final output value of the position of the object on the basis of a result obtained by removing, from a plurality of position candidates for the object estimated in a plurality of trips, a position candidate for the object that has been estimated in a trip evaluated so that the estimation result or position information has an error. In this manner, the position of an object located around a vehicle can be estimated with high precision.

When estimating the positional coordinates of objects in the vicinity based on images captured by onboard cameras, outliers are excluded by statistical processing such as clustering after automatically selecting trips with low reliability due to misalignment of acquired vehicle positional information or inadequate observation pairs due to overspeed. This improves the estimation accuracy. Furthermore, the reliability is output together with the final output value of the estimated object position coordinates. In this case, not only the final output value of the positional coordinates of the object is output together with the reliability, but depending on the usage scene, the final output value with low reliability may be excluded and output. In addition, depending on the scene of use of the calculated positional coordinates of objects, the final output values to be output may be limited if the number is small but the results with high reliability are to be used, such as when human lives are involved in the use for automatic driving. Also, in the case of creating maps for human reference, even if the reliability is low, it would be better if it is clearly stated, so the final output value can be described with the degree of reliability.

By preparing plurality of evaluation criteria and clustering methods to evaluate whether the estimation results or location information has errors, it is possible to select appropriate evaluation criteria and clustering methods for each of the surrounding objects in the location estimation of the surrounding objects, where the errors vary depending on the type of mobile object and the terrain. However, since the selection of evaluation criteria is considered to be generalizable to some extent, it is not necessary to prepare correct coordinates for surrounding objects in all areas.

In the position estimation device according to the present embodiment, when estimating position coordinates of an object that is a surrounding object by triangulation, coordinate candidate points that may adversely affect the accuracy of the final output value are automatically selected from among the coordinate candidate points obtained from images and positional information acquired in a trip that is movement in a predetermined section, and excluded from consideration when calculating the final output value. In the position estimation device according to the present embodiment, clustering processing is also performed to exclude outliers when calculating the final output value from the adopted coordinate candidate points. Furthermore, the position estimation device according to the present embodiment can also automatically calculate and output the confidence of each final output value calculated after completing the clustering process, without referring to the correct coordinates of all objects.

Note that the present invention is not limited to the device configurations and functions in the above-mentioned embodiments, and can be various modified and applied within the range not departing from the gist of the invention.

For example, the case where a vehicle takes an image by an on-vehicle camera while moving has been described as an example, but the embodiments are not limited thereto. The vehicle may sense sensor information other than images while moving.

The case where an evaluation criterion is selected by using correct coordinates in a region having ground truth data has been described as an example, but the embodiments are not limited thereto. For example, the types of evaluation criteria to be selected and the positive and negative correlations can be generalized by obtaining ground truth data for plurality of regions, and the above method can be applied even when ground truth data is not available.

Various kinds of processing executed by the CPU reading software (programs) in the above-mentioned embodiments may be executed by various kinds of processors other than the CPU. Examples of the processors in this case include a programmable logic device (PLD), such as a field-programmable gate array (FPGA), whose circuit configuration can be changed after manufactured, and a dedicated electric circuit, such as an application specific integrated circuit (ASIC), which is a processor having a circuit configuration designed exclusively for executing specific processing. The position estimation processing may be executed by one of these various kinds of processors, and may be executed by a combination of the same or different types of two or more processors (for example, a combination of a plurality of FPGAs and a combination of CPU and FPGA). The hardware configuration of these various kinds of processors is more specifically an electric circuit in which circuit elements such as semiconductor elements are combined.

In each of the above-mentioned embodiments, a mode in which the position estimation program is stored (installed) in the data memory 30 in advance has been described, but the embodiments are not limited thereto. The program may be provided while being stored in a non-transitory storage medium such as a compact disk read only memory (CD-ROM), a digital versatile disk read only memory (DVD-ROM), and a universal serial bus (USB) memory. The program may be downloaded from an external device through a network.

In regard to the above-mentioned embodiments, the following notes are further disclosed.

(Note 1)

A position estimation device for estimating a position of a position estimation target located in a vicinity of a mobile body by using sensor information obtained when the mobile body moves in a predetermined section a plurality of times while carrying out sensing, and position information at which the sensor information is acquired, the position estimation device comprising:
    a memory; and
    at least one processor connected to the memory, wherein the processor is configured to:
        estimate, for each movement in the predetermined section, a plurality of position candidates of the position estimation target based on the position information and the sensor information;
        evaluate, for each movement in the predetermined section, based on the plurality of position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body or does not have any error caused by any of the position of the GPS satellite, the position of the mobile body, or the mobile body; and
        determine a final output value of the position of the position estimation target on the basis of a result obtained by removing, from the plurality of estimated position candidates of the position estimation target at the plurality of times of the movement in the predetermined section, a position candidate of the position estimation target estimated in the movement in the predetermined section that has been evaluated to have the error.

(Note 2)

A non-transitory storage medium having stored thereon a computer-executable program configured to execute position estimation processing for estimating a position of a position estimation target located in a vicinity of a mobile body by using sensor information obtained when the mobile body moves in a predetermined section a plurality of times while carrying out sensing, and position information at which the sensor information is acquired, the position estimation processing comprising:
    estimating, for each movement in the predetermined section, a plurality of position candidates of the position estimation target based on the position information and the sensor information;
    evaluating, for each movement in the predetermined section, based on a plurality of the position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body or does not have any error caused by any of the position of the GPS satellite, the position of the mobile body, or the mobile body; and
    determining a final output value of the position of the position estimation target on the basis of a result obtained by removing, from the plurality of estimated position candidates of the position estimation target at the plurality of times of the movement in the predetermined section, a position candidate of the position estimation target estimated in the movement in the predetermined section that has been evaluated to have the error.

REFERENCE SIGNS LIST

1 Position estimation device
2 Camera
3 GPS sensor
4 Vehicle
10 Input/output interface unit
20 Control unit
20A Processor
20B Program memory
21 Observed data acquisition unit
22 Object detection unit
23 Object matching unit
24 Observation pair generation unit
25 Position estimation unit
26 Output control unit
27 Output control unit
30 Data memory

The invention claimed is:
1. A position estimation method for estimating a position of a position estimation target located in a vicinity of a mobile body, by using a camera and Global Positioning System (GPS) sensor information obtained when the mobile body moves in a predetermined section a plurality of times while carrying out sensing, and position information at which the sensor information is acquired, the position estimation method comprising:

estimating, for each movement of a plurality of movements in the predetermined section, a plurality of position candidates of the position estimation target based on the position information and the camera and the GPS sensor information;

evaluating, for each movement of the plurality of movements in the predetermined section, based on the plurality of position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body, or does not have any error caused by any of the position of the GPS satellite, the position of the mobile body, or the mobile body; and determining a final output value of the position of the position estimation target based on a result obtained by removing, from the plurality of estimated position candidates of the position estimation target at the plurality of times of the movement in the predetermined section, a position candidate of the position estimation target estimated in the movement in the predetermined section that has been evaluated to have the error, wherein the position of the position estimation target is estimated for each trip of the movement body made for the predetermined section.

2. The position estimation method according to claim 1, further comprising:

evaluating, for each combination of a plurality of combinations of the movement in the predetermined section and the position estimation target, whether the position information used to estimate the position candidates has an error caused by any of the position of the GPS satellite used to determine the position information, the position of the mobile body in the real space when the position information is determined, or the mobile body, or does not have any error caused by any of the position of the GPS satellite, the position of the mobile body, or the mobile body, and determining the final output value of the position of the position estimation target based on a result obtained by removing, a position candidate of the position estimation target estimated for a combination of the movement in the predetermined section and the position estimation target that has been evaluated to have the error.

3. The position estimation method according to claim 1, further comprising:

evaluating by a plurality of types of evaluation criteria, and determining the final output value based on a result obtained by removing, a position candidate of the position estimation target estimated in the movement in the predetermined section that has been evaluated to have the error with an evaluation criterion for which an absolute value of a correlation with an error from a correct value prepared in advance is larger than a predetermined threshold among the plurality of types of evaluation criteria.

4. The position estimation method according to claim 3, wherein the plurality of types of evaluation criteria include:

a value of a covariance of the estimated position candidates of the position estimation target;

an absolute value of the covariance of the estimated position candidates of the position estimation target;

a number of times corresponding to predetermined estimation failure conditions that define conditions for failure of estimation of position candidates of the position estimation target;

a distance between two position candidates that are farthest among the plurality of estimated position candidates of the position estimation target;

a value of a determination coefficient when regression analysis is performed on the plurality of estimated position candidates of the position estimation target; or a larger one of eigenvalues of covariance matrixes created for the plurality of estimated position candidates of the position estimation target.

5. The position estimation method according to claim 3, wherein the final output value is determined by removing:

when an evaluation value among the plurality of types of evaluation criteria for which the absolute value of the correlation with the error from the correct value prepared in advance is larger than the predetermined threshold has a positive correlation, the position candidate of the position estimation target estimated in the movement in the predetermined section for which the evaluation criterion is larger than the threshold; and when the evaluation criterion for which the absolute value of the correlation with the error from the correct value prepared in advance is larger than the predetermined threshold has a negative correlation, a position candidate of the position estimation target estimated in the movement in the predetermined section for which the evaluation criterion is smaller than the threshold.

6. The position estimation method according to any one of claims 1 to 5, wherein when determining the final output value for each position estimation target based on the plurality of estimated position candidates of the position estimation target at the plurality of times of the movement in the predetermined section, determining the final output value for each position estimation target from a result obtained by performing clustering on the result obtained by removing the plurality of position candidates of the position estimation targets estimated in the movement in the predetermined section that have been evaluated to have the error, or from a result obtained by carrying out estimation of Gaussian functions indicating density on the result obtained by the removing the position candidate.

7. A position estimation device for estimating a position of a position estimation target located in a vicinity of a mobile body by using a camera and Global Positioning System (GPS) sensor information obtained when the mobile body moves in a predetermined section a plurality of times while carrying out sensing, and position information at which the sensor information is acquired, the position estimation device comprising:

a memory; and at least one processor coupled to the memory, the at least one processor being configured to:

estimate, for each movement of a plurality of movements in the predetermined section, a plurality of position candidates of the position estimation target based on the position information and the camera and the GPS sensor information, evaluate, for each movement of a plurality of movements in the predetermined section, based on the plurality of position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body, or does not have any error caused by any of the position of the GPS satellite, the position of the mobile body, or the mobile body, and determine a final output value of the position of the position estimation target on the basis of a result obtained by removing, from the plurality of estimated position candidates of the position estimation target at the plurality of times of the movement in the predetermined section, a position candidate of the position estimation target estimated in the movement in the predetermined section that has been evaluated to have the error, wherein the position of the position estimation target is estimated for each trip of the moving body made for the predetermined section.

8. A non-transitory storage medium storing a position estimation program executable by a computer for estimating a position of a position estimation target located in a vicinity of a mobile body by using a camera and Global Positioning System (GPS) sensor information obtained when the mobile body moves in a predetermined section a plurality of times while carrying out sensing, and position information at which the sensor information is acquired, so as to execute estimation processing, the estimation processing comprising:

estimating, for each movement of a plurality of movements in the predetermined section, a plurality of position candidates of the position estimation target based on the position information and the camera and the GPS sensor information;

evaluating, for each movement of a plurality of movements in the predetermined section, based on the plurality of position candidates of the position estimation target obtained by the movement in the predetermined section, whether the position information used to estimate the position candidates has an error caused by any of a position of a GPS satellite used to determine the position information, a position of the mobile body in a real space when the position information is determined, or the mobile body, or does not have any error caused by any of the position of the GPS satellite, the position of the mobile body, or the mobile body; and determining a final output value of the position of the position estimation target based on a result obtained by removing, from the plurality of estimated position candidates of the position estimation target at the plurality of times of the movement in the predetermined section, a position candidate of the position estimation target estimated in the movement in the predetermined section that has been evaluated to have the error, wherein the position of the position estimation target is estimated for each trip of the moving body made for the predetermined section.

* * * * *